US011968399B2

United States Patent
Skupin et al.

(10) Patent No.: US 11,968,399 B2
(45) Date of Patent: Apr. 23, 2024

(54) VIDEO CODEC ALLOWING SUB-PICTURE OR REGION WISE RANDOM ACCESS AND CONCEPT FOR VIDEO COMPOSITION USING THE SAME

(71) Applicant: Fraunhofer-Gesellschaft zur Foerderung der angewandten Forschung e.V., Munich (DE)

(72) Inventors: Robert Skupin, Berlin (DE); Yago Sánchez De La Fuente, Berlin (DE); Cornelius Hellge, Berlin (DE); Thomas Schierl, Berlin (DE); Karsten Suehring, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 249 days.

(21) Appl. No.: 17/386,329

(22) Filed: Jul. 27, 2021

(65) Prior Publication Data
US 2021/0360291 A1 Nov. 18, 2021

Related U.S. Application Data

(63) Continuation of application No. PCT/EP2020/052451, filed on Jan. 31, 2020.

(30) Foreign Application Priority Data

Feb. 1, 2019 (EP) .................................... 19155162

(51) Int. Cl.
*H04N 19/70* (2014.01)
*H04N 19/119* (2014.01)
(Continued)

(52) U.S. Cl.
CPC ........... *H04N 19/70* (2014.11); *H04N 19/119* (2014.11); *H04N 19/184* (2014.11); *H04N 19/44* (2014.11)

(58) Field of Classification Search
None
See application file for complete search history.

(56) References Cited

U.S. PATENT DOCUMENTS 11,477,470 B2 * 10/2022 Pettersson .............. H04N 19/70
11,671,625 B2 *  6/2023 Hannuksela .......... H04N 19/46
                                                   375/240.12
(Continued)

FOREIGN PATENT DOCUMENTS

EP     3334162 A1 *  6/2018  ........... H04N 19/174
EP     3734974 A4 *  8/2021  ........... H04N 19/174
(Continued)

OTHER PUBLICATIONS

Hannuksela, Miska M, et al., "AHG12: On grouping of tiles", JVET meeting; Jan. 9, 2019-Jan. 18, 2019; Marrakech; (the Joint Video Exploration Team of ISO/IEC JTC1/SC29/WG11 and ITU-T SG.16 ), Nr:JVET-M0261; Jan. 2, 2019, XP030200251, Jan. 9, 2019, 11 pp.

(Continued)

*Primary Examiner* — Reza Aghevli
(74) *Attorney, Agent, or Firm* — NIXON & VANDERHYE P.C.

(57) ABSTRACT

Video codec concepts which allows more effective video composition/merging and/or a more effective implementation of gradual decoding refresh are described along with concepts of allowing video composition/merging being more effective, for instance, in terms of complexity of the composition/merging task.

27 Claims, 11 Drawing Sheets

(51) Int. Cl.
*H04N 19/184* (2014.01)
*H04N 19/44* (2014.01)

(56) References Cited

U.S. PATENT DOCUMENTS

| | | | | |
|---|---|---|---|---|
| 2004/0008766 A1* | 1/2004 | Wang | ............ | H04N 19/46 375/E7.091 |
| 2019/0182495 A1* | 6/2019 | Bruns | ............ | H04N 19/107 |
| 2021/0014558 A1* | 1/2021 | Fan | ............ | H04N 21/4856 |
| 2021/0329263 A1* | 10/2021 | Hendry | ............ | H04N 19/107 |
| 2022/0053207 A1* | 2/2022 | Deshpande | ............ | H04N 19/51 |
| 2022/0094909 A1* | 3/2022 | Hannuksela | ............ | H04N 19/174 |

FOREIGN PATENT DOCUMENTS

| | | | | |
|---|---|---|---|---|
| JP | 2017-507521 | | 3/2017 | |
| JP | 2017-069866 | | 4/2017 | |
| WO | 2015059194 A1 | | 4/2015 | |
| WO | 2013/150943 | | 12/2015 | |
| WO | 2016026526 A2 | | 2/2016 | |
| WO | 2017137444 A1 | | 8/2017 | |
| WO | WO-2017137444 A1 * | | 8/2017 | ......... H01L 31/1075 |
| WO | WO-2018160957 A1 * | | 9/2018 | ........... H04N 19/105 |
| WO | WO-2019243534 A1 * | | 12/2019 | ........... H04N 19/119 |
| WO | WO-2020142704 A1 * | | 7/2020 | ........... H04N 19/105 |

OTHER PUBLICATIONS

Sjoberg, Rickard, et al., "Overview of HEVC high-level syntax and reference picture management", IEEE Transactions on Circuits and Systems for Video Technology, Dec. 1, 2012 Institute of Electrical and Electronics Engineers, US-ISSN 1051-8215, vol. 22, Nr:12, XP055045360, pp. 1-14.

Gabriel et al, "Proposed design of high-level syntax for spatial relation between independent HEVC sub bitstreams" JCTVC-AB0032, Joint Collaborative Team on Video Coding (JCT-VC) of ITU-T SG 16 WP 3 and ISO/IEC JTC 1/SC 29/WG 11, 28th Meeting, Torino, IT, Jul. 15-21, 2017, 9 pages.

Wang, "AHG9: Signalling of regions of interest and gradual decoding refresh" JCTVC-K0128r2, Joint Collaborative Team on Video Coding (JCT-VC) of ITU-T SG 16 WP 3 and ISO/IEC JTC 1/SC 29/WG 11, 11th Meeting, Shanghai, CN, Oct. 10-19, 2012, 8 pages.

Bar-Nir, "Proposal to Improve Ultra Low Delay Coding with Minimal Decoder Impact" JCTVC-H0471, Joint Collaborative Team on Video Coding (JCT-VC) of ITU-T SG16 WP3 and ISO/IEC JTC1/SC29/WG11, 8th Meeting, San Jose, CA, Feb. 1-10, 2012, 5 pages.

* cited by examiner

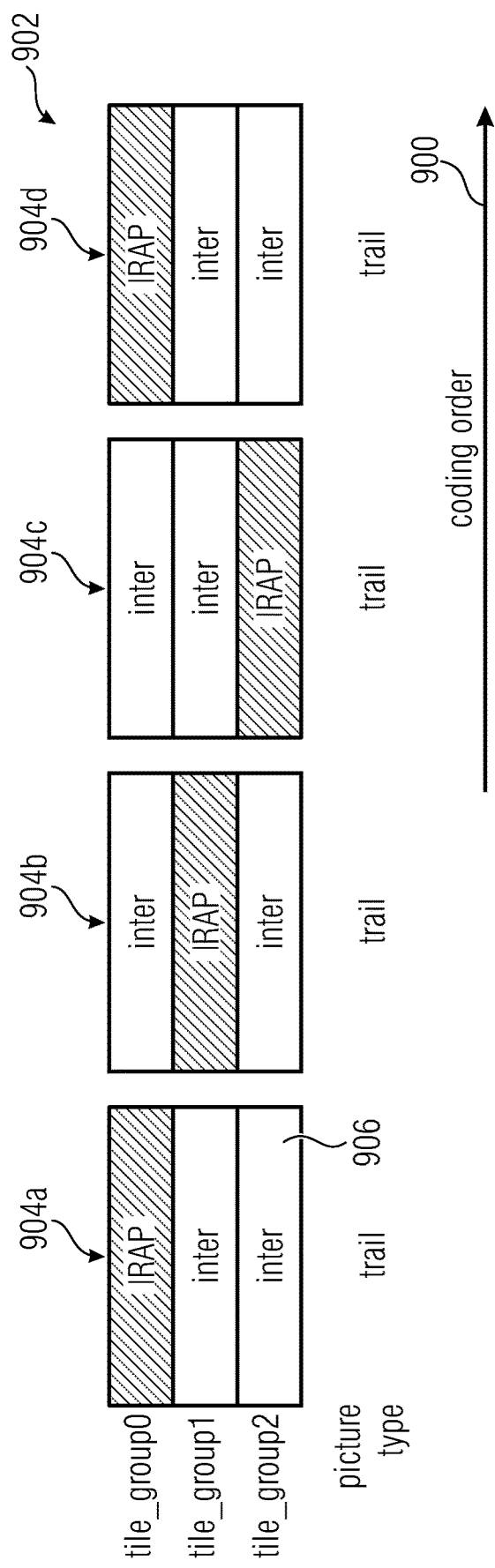

VIDEO CODEC ALLOWING SUB-PICTURE OR REGION WISE RANDOM ACCESS AND CONCEPT FOR VIDEO COMPOSITION USING THE SAME

CROSS-REFERENCES TO RELATED APPLICATIONS

This application is a continuation of copending International Application No. PCT/EP2020/052451, filed Jan. 31, 2020, which is incorporated herein by reference in its entirety, and additionally claims priority from European Application No. EP 19 155 162.1, filed Feb. 1, 2019, which is/all of which are incorporated herein by reference in its/their entirety.

The present application is concerned with video coding and video composition.

BACKGROUND OF THE INVENTION

Various applications make use of sub-pictures, i.e., a sub-divisioning of the video pictures into sub-pictures for sake of separate encoding and decoding. Among these applications, there is 360° video and gradual decoding refresh.

In case of 360° video, sub-pictures (tiles in case of HEVC) are offered separately at different resolutions as shown on the left side of FIG. 1. Users select some tiles at high-resolution and some a low-resolution depending on their viewing orientation as shown in the middle of FIG. 1 and is merged into a common bitstream as shown on the right side of FIG. 10. Whenever, the user changes its viewing orientation the set of tiles at high-resolution and low-resolution change. However, not all tiles of high-resolution turn to low-resolution tiles and vice versa. This means that only for the subset of tiles that change their resolution, a switching point may be used, which typically is a Random Access Point (RAP) for that specific sub-picture bitstream.

Gradual decoding refresh (GDR) is a mechanism to start decoding a bitstream at non RAPs and be able after decoding a given number of pictures to show the video at the same quality as if the decoding process would have been started at a RAP as illustrated in FIG. 11

In FIG. 11, for instance, illustrates four consecutive non-RAP pictures (consecutive in coding order 900) as being equally sub-divided into three tile groups tile_group0, tile_group1 and tile_group2, i.e., into regions of the respective pictures. The picture of the video 902 are indicated by reference signs 904*a* to 904*d* and the regions into which they are sub-divided are indicated using reference 906. Each region 906 is indicated as either being coded in a self-contained manner, i.e., in a manner forming a random access point, namely by having an "IRAP" inscribed therein, or not, i.e. as coded in a manner referencing other pictures, by having an "inter" inscribed therein. None of the four pictures 904*a* to 904*d* shown in FIG. 11 has all regions 906 coded as random access points. Rather, in the example of FIG. 11, merely one of its regions is a random access point, but in the example of FIG. 11, the random access point regions of three consecutive pictures, such as pictures 904*a* to 904*c*, spatially completely cover the picture area of the pictures of video 902 and accordingly, after such triplet of pictures, the last picture of such triplet, here picture 904*c*, is available at the decoder free of artifacts provided that the encoder took care that the non-RAP regions of that picture 904*c* merely referenced—for sake of prediction and/or entropy context derivation, for instance, i.e., in terms of coding interdependencies—regions being RAP regions or non-RAP regions which, themselves, directly or indirectly having coding dependencies on RAP regions only. That is, a clean decoded picture is not achieved instantaneously as when the decoding starts with a RAP but after a while, after the decoded pictures have been gradually refreshed to get rid of the artifacts of missing references. Here, this is picture 904*c*. Typically, GDR can be achieved by dividing the content in regions (e.g. tiles) and encoding them with non-aligned sub-picture RAPs.

As a consequence of any of the two mentioned scenarios, references across the different sub-bitstreams vary. Also RAP marking, for the different sub-pictures, is not clearly done as such sub-pictures are only signaled as I_SLICES types (no prediction to previous decoded picture applied) and breaking prediction for consecutive sub-pictures of the same sub-picture bitstream is only done by not including sub-pictures previous to the pictures with I_SLICE type in reference picture lists.

Despite the above existing video coding concepts, there is still a need for video coding environment allowing for a more effective video composition, for instance, and/or a more effective implementation of a gradual decoding refresh.

It is, thus, the object of the present invention to provide a video codec which allows more effective video composition/merging and/or a more effective implementation of gradual decoding refresh and/or a concept of allowing video composition/merging being more effective, for instance, in terms of complexity of the composition/merging task.

SUMMARY

An embodiment may have a video decoder for decoding a video of pictures from a data stream, the data stream having the video encoded thereinto in a manner according to which sub-pictures into which the pictures are spatially sub-divided are encoded independently from each other, the video decoder configured to: decode from the data stream, for each sub-picture of each picture of a set of one or more pictures of the video, a sub-picture related information which, when assuming a first state, identifies the respective sub-picture as being coded in a random access point manner and, when assuming a second state, identifies the respective sub-picture as not being coded in the random access point manner, decode from the data stream, for the set of one or more pictures, a random access point signaling granularity indication which, when assuming a first granularity, indicates that, for each picture of the set of one or more pictures, the sub-picture related information assumes a common state for all sub-pictures of the respective picture, and when assuming a second granularity, indicates that, for each picture of the set of one or more pictures, the sub-picture related information is allowed to assume different states for the sub-pictures of the respective picture.

Another embodiment may have a video composition apparatus configured to compose a composed data stream out of a plurality of sub-streams, the composed video data stream having a composed video of composed pictures encoded thereinto which are subdivided into sub-pictures, wherein the sub-streams have encoded thereinto the sub-pictures of the composed pictures of the composed video in a manner so that for each composed picture, each sub-picture of the respective composed picture, is encoded into one of the sub-streams independent from other sub-pictures of the respective composed video which are encoded into the other of the sub-streams, the video composition apparatus configured to: compose the composed data stream by putting together the sub-streams with, for each sub-stream, taking over from the respective sub-stream into the composed data stream, for each sub-picture encoded into the respective sub-stream, a sub-picture related information which identifies, when assuming a first state, the respective sub-picture as being coded in a random access point manner and, when assuming a second state, identifies the respective sub-picture as not being coded in a random access point manner, set in the composed data stream, for a sequence of composed pictures, a random access point signaling granularity indication so as to assume a first granularity, thereby indicating that, for each composed picture of the sequence of composed pictures, the sub-picture related information is allowed to assume different states for the sub-pictures of the respective composed picture.

Another embodiment may have a data stream having a video of pictures encoded thereinto in a manner according to which sub-pictures into which the pictures are spatially sub-divided are encoded independently from each other, the data stream including: for each sub-picture of each picture of a set of one or more pictures of the video, a sub-picture related information which, when assuming a first state, identifies the respective sub-picture as being coded in a random access point manner and, when assuming a second state, identifies the respective sub-picture as not being coded in the random access point manner, for the set of one or more pictures, a random access point signaling granularity indication which, when assuming a first granularity, indicates that, for each picture of the set of one or more pictures, the sub-picture related information assumes a common state for all sub-pictures of the respective picture, and when assuming a second granularity, indicates that, for each picture of the set of one or more pictures, the sub-picture related information is allowed to assume different states for the sub-pictures of the respective picture.

Another embodiment may have a method for decoding a video of pictures from a data stream, the data stream having the video encoded thereinto in a manner according to which sub-pictures into which the pictures are spatially sub-divided are encoded independently from each other, the method including: decode from the data stream, for each sub-picture of each picture of a set of one or more pictures of the video, a sub-picture related information which, when assuming a first state, identifies the respective sub-picture as being coded in a random access point manner and, when assuming a second state, identifies the respective sub-picture as not being coded in the random access point manner, decode from the data stream, for the set of one or more pictures, a random access point signaling granularity indication which, when assuming a first granularity, indicates that, for each picture of the set of one or more pictures, the sub-picture related information assumes a common state for all sub-pictures of the respective picture, and when assuming a second granularity, indicates that, for each picture of the set of one or more pictures, the sub-picture related information is allowed to assume different states for the sub-pictures of the respective picture.

A first aspect of the present application aims at rendering video composition/merging and/or the implementation of gradual decoding refresh in a video codec more effective by introducing a random access point signaling granularity indication which indicates to a video decoder at which granularity a sub-picture related information is allowed to vary spatially within pictures of the video. The sub-picture related information identifies respective sub-pictures as being coded in a random access point manner or not being coded in a random access point manner. Namely, if the random access point signaling granularity indication which is signaled in the data stream separate from, or in addition to, the sub-picture related information, assumes a first granularity, this indicates that, for each picture of a set of one or more pictures which forms a scope of the random access point signaling granularity indication, the sub-picture related information assumes a common state for all sub-pictures of the respective picture. That is, all sub-pictures then either assume the first state signaling a random access point coding of the associated sub-picture, or a second state signaling a non-random access point coding of the associated sub-picture. If, however, the random access point signaling granularity indication assumes a second granularity, this indicates that, for each picture of the set of one or more pictures, the sub-picture related information is allowed to assume different states for the sub-pictures of the respective picture. As a consequence of the introduction of such a random access point signaling granularity indication, the task of composing such a data stream having a video encoded there into in a manner according to which its pictures are sub-divided into sub-pictures, is alleviated in terms of requirements posed onto the reservoir of one or more input video streams, sometimes called sub-streams herein, which have the sub-pictures coded there into. In particular, these input video streams need not to be coded in an mutually dependent manner where, if one sub-picture in one sub-stream is RAP coded, temporally aligned sub-pictures of other substreams are coded in a RAP manner as well. If some substreams are coded in one common input video stream same may be coded in the usual manner where each picture of the respective input video data stream is coded in a manner where all sub-pictures of the respective picture have a sub-picture related information associated therewith in the input video data stream, which is either the first state for all sub-pictures of the respective picture or the second state for all sub-pictures of the respective picture. But temporally aligned sub-pictures in other substreams may not be coded in a RAP manner. In composing the video data stream comprising the random access point signaling granularity indication, the composer/merger is free to compose pictures of the video coded into the composed data stream in a manner so that there are pictures sub-divided into sub-pictures, the sub-picture related information of which has been adopted, or taken over, from the respective input video data stream despite at least on being a RAP while at least another is not. Thus, there is no need to introduce, for instance, one or more new states for the sub-picture related information present in the composed data stream for each sub-picture. In other words, the sub-picture related information may simply be taken over from the respective reservoir of one or more input video data streams.

The sub-pictures may be tiles or groups of tiles, i.e., sub-pictures may be independently coded from other sub-pictures of the same picture. Sub-pictures may, alternatively, be tiles or groups of tiles forming an MCTS, i.e., a motion constrained tile set, meaning that sub-pictures may, beyond this, be independently coded from sub-pictures of other pictures, which are spatially offset, wherein the pictures may, in that case, be sub-divided into the sub-pictures in a constant manner so that sub-pictures of different pictures are co-aligned or spatially aligned with the sub-picture boundaries spatially coinciding. Such a data stream including such a random access point signaling granularity indication, would thus be able to signal the sub-picture related information by way of using the same alphabet as used in the reservoir of substreams which might have been coded in the picture granularity regime. The sub-picture related information may, for instance, comprise an integer-valued syntax element discriminating between a plurality of types such as NAL unit types. Each sub-picture may be coded in one or more NAL units, each NAL unit having, for instance, such an integer-valued syntax element. Accordingly, irrespective of whether the random access point signaling granularity indication would indicate the first or second granularity, a first subset of one or more NAL unit types of the plurality of NAL unit types discriminated between by the integer-valued syntax element, would correspond to the first state of the sub-picture related information, while a second subset of one or more NAL unit types would correspond to the second state thereof.

The random access point signaling granularity indication could be contained in an SPS or VPS of the data stream with the set of one or more pictures forming the scope of the random access point signaling granularity indication comprising a sequence of picture of the video or covering the whole video. Alternatively, the random access point signaling granularity indication could be convey in the data stream per access unit, with the set of one or more pictures forming the scope of the random access point signaling granularity indication comprising one picture only.

Video decoders not being able to parse the random access point signaling granularity indication might identify the data stream as a non-conforming data stream in case of the sub-picture related information assuming, for any picture, different states for different sub-pictures of this picture. The other video decoders, being able to parse and decode the random access signaling granularity indication, could adapt the decoding behavior depending on this indication: they could identify the data stream as a non-conforming data stream in case of the random access point signaling granularity indication assuming the first granularity and the sub-picture related information assuming, for any picture of the set of one or more pictures forming the scope of the random access point signaling granularity indication, different states for different sub-pictures of this picture.

Additionally or alternatively, more functionalities of the video decoder could be activated in case of the random access point signaling granularity indication assuming the second granularity, i.e., the sub-picture granularity, with the same being discussed subsequently with respect to the further aspects of the present application as these functionalities may likewise be advantageously used to achieve more effective video codecs irrespective of using the juxtaposition of sub-picture related information on the one hand and random access point signaling granularity indication on the other hand. That is, decoders according to the following aspects could only operate in the subpicture granularity regime without any need to signal the use of this regime.

In accordance with a second aspect of the present application, it is the aim to render a video codec more flexible in terms of its use with respect to sub-picture-wise coding and, for instance, with respect to its use for representing composed videos. The pictures thereof are sub-divided into sub-pictures. The aim is achieved by rendering video decoders responsive to an evaluation of the sub-picture related information conveyed in the data stream for each sub-picture. In particular, in accordance with the second aspect, the data stream having such a video encoded there into, comprises for each sub-picture of each picture sub-picture related information which, when assuming a first state, identifies the respective sub-picture as being coded in a random access point manner, and when assuming a second state, identifies the respective sub-picture as not being coded in a random access point manner. The video decoder inspects the pictures with respect to the sub-picture related information of its sub-pictures. If the sub-picture related information assumes, for any picture, the first state for all sub-pictures of the predetermined picture, i.e., all its sub-pictures represent random access points, the video decoder flushes its decoded picture buffer. Similar to the first aspect, such concept allows for composing a data stream out of sub-steams which have actually been generated for a different video codec domain where sub-pictures within one picture were obliged to coincide in sub-picture related information, i.e., all sub-picture of one picture would have to assume the same state. Nevertheless, when composing such data stream, the states of the sub-picture related information for the various sub-pictures used to compose the data stream may simply be adopted or taken over therefrom. Further, video decoder is able to, nevertheless, identify true random access points in that the whole picture may be recovered artifact-free by identifying pictures where the sub-picture related information assumes the first state for all sub-pictures of the respective picture. In combination with the first aspect, the video decoder may apply this functionality of identifying random access point pictures where the decoded picture buffer may be flushed responsive to seeing that the sub-picture related information for such pictures assumes the first state for all sub-pictures of the respective picture, if the random access point signaling granularity indication assumes the second granularity, i.e., the sub-picture granularity. Combined with the first aspect, such a video decoder may even change its scheduling in flushing the decoded picture buffer: in case of the random access point signaling granularity indication assuming the first granularity, i.e., picture-wise granularity, the video decoder could flush the decoded picture buffer responsive to the sub-picture related information assuming the first state for a first sub-picture of a certain picture in accordance with a decoding/coding order among the sub-pictures as the sub-picture related information relating to the other sub-pictures may be used to assume the same state, i.e., first state, anyway. The flushing of the decoded picture buffer responsive to the sub-picture related information assuming, for a certain picture, the first state for all sub-pictures of the predetermined picture in case of the random access point signaling granularity indication assuming the second granularity, i.e., sub-picture granularity, in turn, could be scheduled to take place when decoding the last sub-picture of that picture.

The third and fourth aspects of the present application concern the decoded picture buffer management on the side of the decoder. These aspects of the present application may be combined with any of the first and second aspects and have a similar aim as outlined above with respect to aspects 1 and 2. That is, the third and fourth aspects of the present application aim at providing a video codec which allows a composed data stream to be composed out of sub-picture related sub-streams in a manner so that the composer/merger needs not to harmonize or unify the reference picture buffer descriptions describing the set of reference pictures ought to remain in the DPB which are signaled in the various sub-streams contributing to the composed data stream so that the composed data stream would signal, right away, at the beginning of each picture as to which pictures form, for a current picture, the set of reference pictures so that the decoder may remove all other pictures from the decoded picture buffer at the beginning of this current picture. Rather, in accordance with the third and fourth aspects, the video codec allows for the data stream to signal the reference picture buffer description which provides information on a set of reference pictures needed for decoding a current picture or for decoding at a next picture for each sub-picture of a currently coded/decoded picture individually, so that the reference picture buffer descriptions may differ between sub-pictures of a current picture. Such a reference picture buffer description describes for a current sub-picture of a current picture, pictures containing sub-pictures serving as a reference for the current sub-picture or a sub-picture of a following picture which is associated with the current reference picture by way of their origin, for instance, as there relate to one sub-video, for instance. When coded as separate sub-videos, the sub-pictures' buffer descriptions are actually indicative of reference pictures which contain sub-pictures which are of the same sub-video and are to maintained in the DPB as the sub-pictures serve as reference for the current sub-picture or following sub-pictures of that sub-video. In accordance with the third aspect of the present application, the decoder has the functionality of forming a union of the sets of reference pictures for the sub-pictures of this current picture ought to remain in the DPB according to the sub-pictures' reference picture buffer descriptions in order to mark those pictures in the decoded picture buffer, which are to remain therein, while the other pictures are removed from the decoded picture buffer such as at the end of decoding the current picture. In accordance with the fourth aspect of the present application, the decoder is capable of performing the emptying of the decoded picture in units of sub-pictures rather than complete pictures. The marking and removal of sub-pictures is performed separately for each sub-picture. Even other words, in accordance with the fourth aspect, the decoded picture buffer is managed in units of one sub-picture decoded picture buffer per sub-picture of a currently decoded picture and the marking of sub-pictures ought to remain in the respective sub-picture decoded picture buffer while the other ought to be removed therefrom is performed on the basis of the reference picture buffer description submitted in the data stream for the respective sub-picture of the currently decoded picture. As already mentioned above, the latter third and fourth aspects may be combined, for instance, with the first aspect so that the decoder may have the functionalities just-described with respect to the third and fourth aspects, for instance, in case of the random access point signaling granularity indication assuming the second granularity, while managing/emptying the decoded picture buffer in units of pictures in case of the random access point signaling granularity indication assuming the first granularity, i.e., picture granularity, in which case the decoder may be configured to perform the decoded picture buffer emptying and marking based on the first encountered reference picture buffer description for a currently decoded picture, i.e. based on the reference picture buffer description signaled first for the current picture.

A fifth aspect of the present application is concerned with POC handling. Similar to the third and fourth aspects, the fifth aspect aims at providing a video codec which allows a data stream to be composed of sub-streams having been coded separately such as using different random access point period, groups of pictures or even using different frame rates, thereby resulting in temporally co-aligned sub-pictures ought to contribute to the compose data stream which are, in fact, signaled in the various sub-streams with different POC values. The fifth aspect of the present application is combinable with any of the previous ones and aims at alleviating such a composition/merging procedure by freeing the composer/merger from having to harmonize POC values of sub-streams associated with different sub-pictures and having different origins. Rather, the video codec allows the data stream to signal different POC values for sub-pictures actually belonging the same picture of the data stream, with the decoder being configured to derive, for each sub-picture of a currently decoded picture, a final POC value for the respective sub-picture based on the decoded POC value for that sub-picture and one or more inter-sub-picture POC compensation parameters associated with a respective sub-picture and kept updated by the decoder so that, for each picture, the final POC values of the sub-pictures are equal to each other for each picture of the video. The one or more inter-sub-picture POC compensation parameters may compensate for frame rate differences between the contributing sub-streams, different sizes of groups of pictures, different POC minimum numbers and the like. The one or more inter-sub-picture POC compensation parameters may comprise a POC offset value and POC step size difference. Some parameters may be determined by the decoder itself such as the POC offset value at random access point sub-pictures on the basis of a difference between their signaled POC values and the final POC values of at least one other sub-picture of the same picture not forming a random access point. Hints on POC step size differences may, in turn, be conveyed in the data stream so as to guide the decoder and alleviate the determination of these POC step size differences. These hints may be inserted into the data stream by the composer/merger which has access to this knowledge based on high level parameters in the contributing sub-streams.

A sixth aspect of the present application is concerned with the idea of a video codec implementing gradual decoding refresh in a manner where the decoder is aware of the gradual decoding refresh not only in terms of the point in time or in terms of the picture from which onwards the gradual decoding refresh is completed, but also in terms of meeting certain constraints on performing prediction derivation on the basis of coding parameters conveyed in the data stream during the gradual decoding refresh. In particular, in accordance with the sixth aspect of the present application, the video decoder is configured to log, for each of reference pictures of the video, a sub-division of the reference pictures into a refreshed picture region and a non-refreshed picture region. The decoder decodes from the data stream an information on a refresh renewal region within a currently decoded picture and decodes the refresh renewal region from the data stream using inter-prediction. Further, the decoder determines a first region of the currently decoded picture, disjoined to the refresh renewal region and to be coded/decoded independent from the non-refreshed picture region of the reference pictures and decodes the first region from the data stream by deriving, based on the coding parameters the signal in the data stream for the first region, the prediction for the first region from the reference pictures in a manner dependent on a location of the refreshed picture region of the reference pictures so that the prediction is independent from the non-refreshed picture region of the reference pictures. For instance, motion vectors may be clipped so as to reach out into the non-refreshed picture region, and/or padding may be used in order to fill-in portions of motion-compensated predicted blocks in reference pictures exceeding the refreshed picture region into the non-refreshed picture region. Alternatively, motion vector candidate list construction may exclude motion vectors stemming from outside the refreshed picture region. A second region may be treated by the decoder differently. The second region is disjoined to the first region and the refresh renewal region and may be decoded by the decoder including predictions from the refreshed picture region as well as the non-refreshed picture region. By this measure, the refreshed picture region continuously grows from picture to picture. The decoder is aware of the growth as the decoder has to even keep track of the growth of the refreshed picture region and has to perform the prediction derivation with respect to the first region accordingly. Rendering the decoder aware of the gradual decoding refresh has several advantages: the decoder is aware of the current refreshing situation, possible random access periods and so forth. The efforts associated with the prediction derivation and the necessity to render this derivation dependent on the location of the refreshed picture region of the reference pictures comes at almost no cost as a decoder may need to implement similar measures, for instance, at the outer boundary of pictures or the outer boundary of independently coded picture tiles. The encoder, in turn, is able to encode the coding parameters in a wider range of values as the decoder redirects some signalable states of the coding parameters from predictions which would lead to a dependency on non-refreshed picture regions of reference pictures to predictions solely depending on refreshed picture regions. Enlarging the coding parameter signalable states, however, may lead to higher compression efficiency with respect to the coding of these coding parameters.

BRIEF DESCRIPTION OF THE DRAWINGS

Embodiments of the present invention will be detailed subsequently referring to the appended drawings, in which:

FIG. 11 shows a schematic diagram illustrating a gradual decoding refresh.

DETAILED DESCRIPTION OF THE INVENTION

Figure 1:
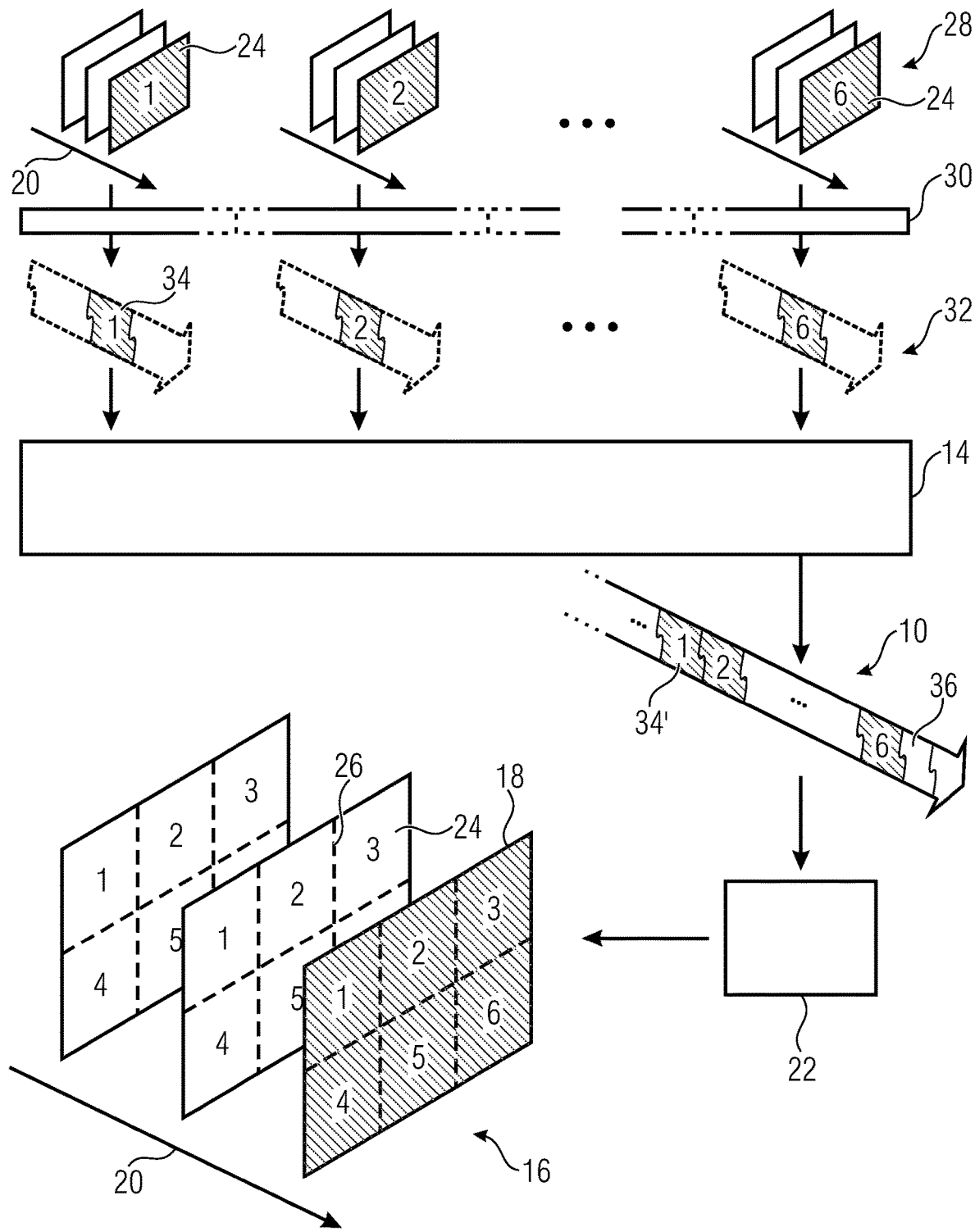
FIG. 1 shows a schematic diagram illustrating an environment for composing a data stream on the basis of several input sub-streams or merging sub-streams into a composed data stream, wherein a decoder decodes that composed data stream; corresponding encoders for forming the sub-streams as well as the composer/merger itself are also shown; the embodiments described with respect to FIGS. 2 to 8 are used to describe favorable functionalities and concepts which could be applied by a composer/merger and/or the decoder.

With respect to FIG. 1, a task of composing a data stream out of a reservoir of sub-streams is explained. This is done to explain the problems associated therewith, namely associated with the different origins of the sub-streams and the difference in, for instance, random access point positioning, associated POC values, different GOP structure and so forth just to mention a few. These problems are then solved in accordance with the embodiments described subsequently. These embodiments relate to different aspects of the present application and they may be combined mutually in order to result into further embodiments as it will also be explained further below. It should be noted, however, that some of the assumptions made in FIG. 1 are not necessary for embodiments described later on or, differently speaking, that some of the features explained and discussed with respect to FIG. 1 may be left off with respect to embodiments describes subsequently with nevertheless achieving advantages from the aspects which the respective embodiment deals with. Such circumstances will also be discussed below.

FIG. 1 shows a scenario where a data stream 10 is generated by composing same on the basis of a plurality of, or a reservoir of, sub-streams 12. This process of composing or merging is done by a composer/merger 14. In particular, the data stream 10 is generated in such a manner that same has a video 16 of pictures 18 encoded there into. Arrows 20 in FIG. 1 shall illustrate the presentation time order defined among the pictures 18 of video 16, i.e., the order at which the pictures 18 are output by a decoder 22 when the latter decodes video 16 from data stream 10. The pictures 18 are spatially sub-divided into sub-pictures 24 as illustrated by dashed lines 26 in FIG. 1 which, thus, represent the sub-pictures' borders. In particular, the data stream 10 has the video 16 encoded there into in a manner according to which the sub-pictures 24 are encoded independently from each other. The independent encoding of sub-pictures into data stream 10 and consequently, the possibility of decoding the sub-pictures 24 from data stream 10 in a manner independently from each other, relates, at least, to sub-pictures within one picture 18, i.e., picture-internally. For instance, in FIG. 1, pictures 18 are illustrated as being sub-divided into sub-pictures 24 so that each picture 18 comprises six sub-pictures which are enumerated in FIG. 1 by having respective digits inscribed therein. Accordingly, sub-picture 3, for instance, is encoded into data stream 10 in a manner independent from any other sub-picture of the same picture 18. Accordingly, the sub-picture 3 such as the one shown hatched in FIG. 1 may be decoded from data stream 10 by decoder 22 in a manner independent from the other sub-pictures 1, 2, 4, 5 and 6 of the same picture 18, i.e., the ones shown also hatched. A further characteristic of data stream 10 according to FIG. 1 is, however, that the pictures 18 of video 16 are spatially sub-divided into the sub-pictures 24 in a manner constant over the sequence of pictures. That is, their boundaries 26 spatially coincide when comparing different pictures. Beyond this, collocated or spatially aligned sub-pictures, i.e., the sub-pictures 24 in FIG. 1 having the same digit inscribed therein, form one sub-video in that each sub-picture 24 is encoded independently not only from the other sub-pictures of the same picture, but also of sub-pictures of other pictures which are spatially offset relative to the respective sub-picture, i.e., all sub-pictures belonging to another sub-video or having another digit inscribed therein in FIG. 1. Speaking in terminology of HEVC, for instance, each sub-picture 24 of FIG. 1 may be an MCTS. Without the latter characteristic of coding independency or spatially offset sub-pictures of even different pictures of video 16, sub-pictures 24 may be, using the terminology of HEVC, for instance, as one or more tiles.

The individual sub-videos formed by spatially co-aligned sub-pictures 24 of video 16 are shown in FIG. 1 at 28 again. All these sub-videos are, thus, composed of sequences of sub-pictures 24. An encoder 30 encodes these sub-videos 28 independently into a plurality of, or a reservoir of, sub-streams 32. In fact, the sub-videos 28 may be treated by encoder 30 in groups. A group of sub-videos 28 may be coded into one input data stream, so as to have a video encoded there into which is composed of the group of the sub-videos 28 in a manner coded independently from each other so that such an input video data stream is composed of a sub-stream 32 for each sub-video 28. The sub-streams 32 are received by the composer/merger 14 which, in turn, composes data stream 10 on the basis of the sub-streams 32. Depending on the application, merely a subset of the sub-videos 28 or merely a subset of the sub-streams 32 may, in fact, contribute to the data stream 10 and this subset may, beyond this, change or vary among the pictures 18 of video 16.

The aim of such a composition/emerging task as done by composer/merger 14 is to perform the task in the encoded domain. That is, re-quantization of prediction residuals or re-performing motion compensation is avoided by composer/merger 14. Each sub-picture 24 of the sub-videos 28 is, for instance, coded into one or more NAL units 34 of the corresponding sub-stream 32 and if the sub-picture 24 belongs to those ought to contribute to video 16 of the composed data stream 10, then composer/merger 14 inserts the respective one or more NAL units into the data stream 10 as shown using the same reference sign, namely 34, but with an apostrophe in order indicate that, nevertheless, composer/merger 14 may have to adapt other coding parameters in these NAL units, other than motion vector information or prediction residual data. In accordance with the embodiments set out herein below, the composer/merger 14 is given the opportunity to lessen portions of the sub-streams 32 which have to be adapted when forming data stream 10 on the basis of the sub-streams 32. This also relates to parameter sets of the sub-streams 32 or the input video data streams the sub-streams are part of, when the composer/merger 14 aims at forming a corresponding parameter set 36 in data stream 10.

Figure 10:
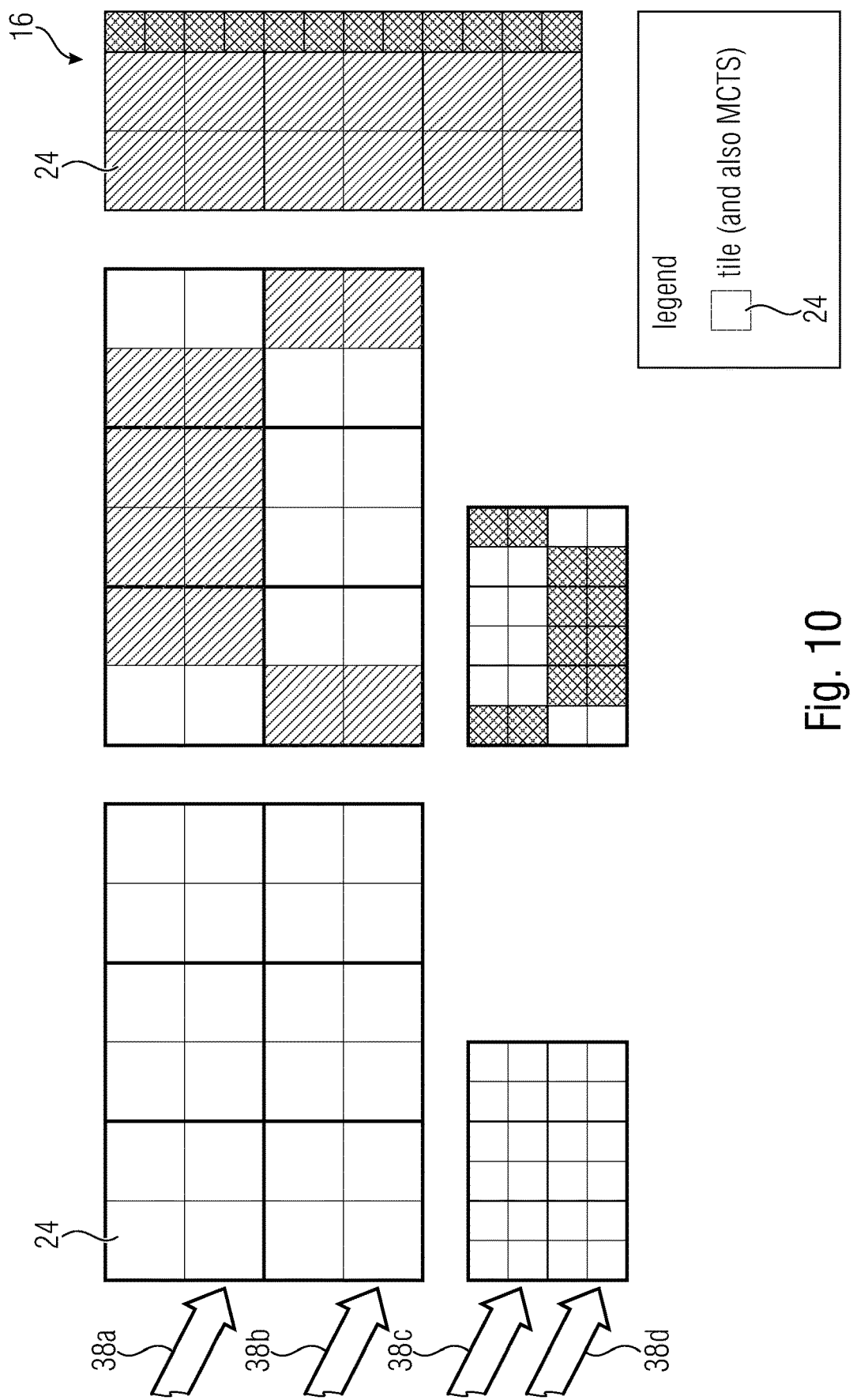
FIG. 10 shows a schematic diagram illustrating an example for a 360° streaming example where a video data stream is composed of sub-streams relating to different MOTS of a panoramic scene.

The situation of FIG. 1 may be illustrated by additionally making reference to FIG. 10. FIG. 10 shows a case where the reservoir of sub-videos 28 form sub-sections of a 360° video. In the example of FIG. 10, the whole scene was sub-divided into 24 sub-video. Many sub-videos were offered in the example of FIG. 10: 24 sub-videos showed this scene at high resolution and were encoded by encoder 30 into two input video data streams 38a and 38b, one time more efficiently using a larger RAP distance, and the other time, such as with respect to input video data stream 38b, using a lower RAP distance, thereby leading to a less efficient compression. Likewise, two further input video data streams were offered, each of which also had the complete scene with 24 sub-videos encoded there into, again, one 38c having a higher RAP distance, and the other, 38d, having a lower RAP distance. The pictures 16 of the composed video data stream were illustrated as showing the complete scene. In particular, each picture 16 is composed of 12 mutually temporally aligned sub-pictures of the sub-videos coded into data streams 38a and 38b, and 12 sub-pictures mutually temporally aligned and temporally aligned to the high resolution sub-pictures, which are taken from data streams 38c and 38d. That is, the viewport was assumed in the example of FIG. 10 to be 12 sub-pictures or tiles wide. In the middle of FIG. 10, hatching shows the selection of sub-pictures 24 within pictures 16 of the composed data stream, which contribute to the pictures 16 of the composed video at high resolution and which in low resolution. Another choice is made with respect to the different RAP distance versions. For each high resolution sub-picture 24 and for each low resolution sub-picture 24, for a certain picture time instance, there are one or more NAL units in data stream 38a and 38c, respectively, being coded more efficiently using a higher RAP distance, and another 38b and 38d, respectively, coded using a lower RAP distance. Preferably, the composed data stream 10 is composed using the NAL units of the more efficiently coded data streams 38a and 38c. All of data streams 38a to 38d may have the sub-streams 38 encoded there into using synchronous random access points within each data stream 38a to 38d, individually. That is, the pictures of the video coded in each of data streams 38a to 38d, are subdivided into 24 sub-pictures 24 each, and for each such picture, either all or none of the sub-pictures are coded in a random access point manner into the respective input video data stream 38a to 38d.

Figure 8:
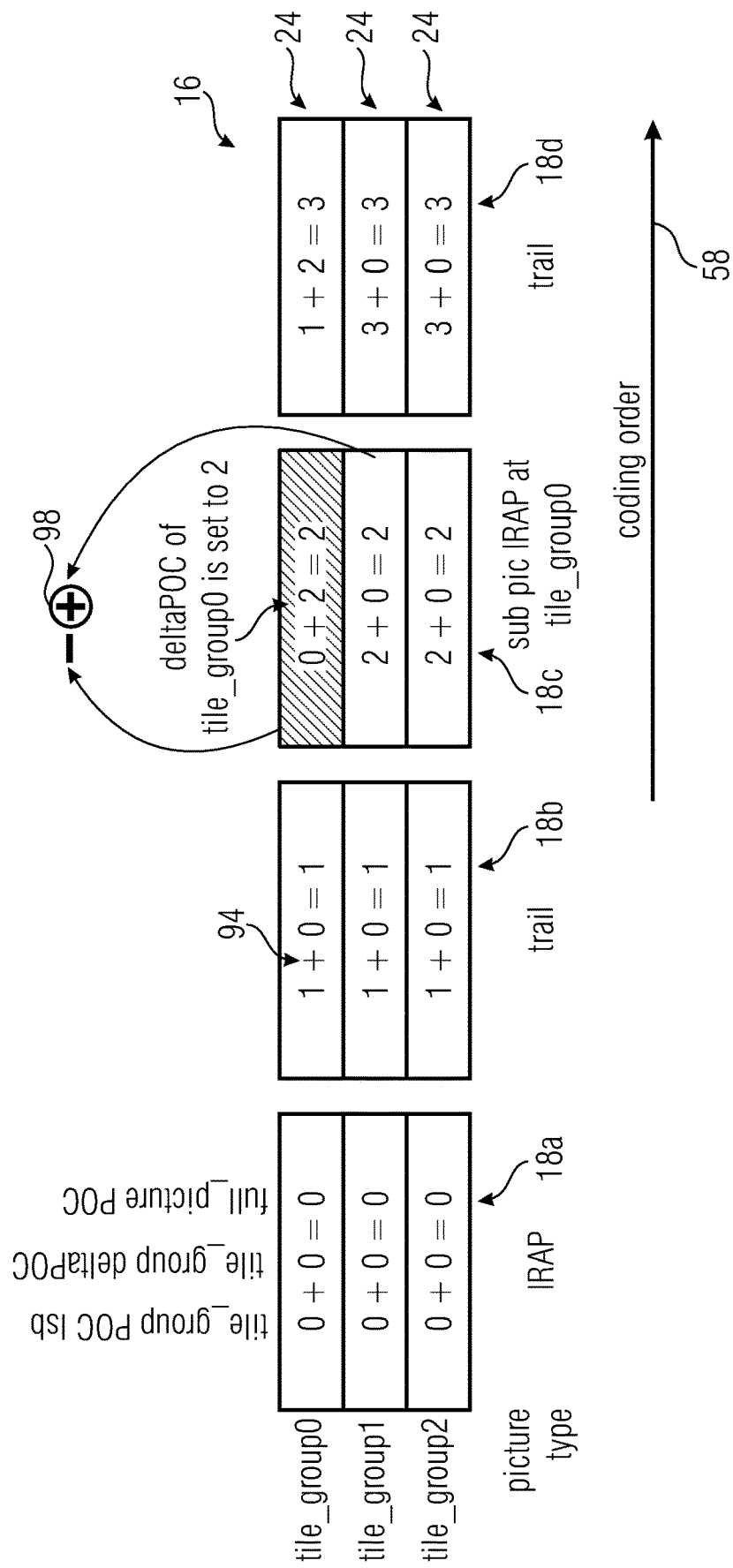
FIG. 8 shows a schematic diagram illustrating the concept of FIG. 7 with respect to POC offset compensation at random access point sub-pictures in accordance with an embodiment.

Problems occur whenever the viewport changes. That is, the selection of the contributing sub-streams which contribute to the composition/merging of data stream 10 changes. In the example of FIG. 8, 96 sub-streams are available, but only 24 contribute to the composed data stream 10 with respect to a certain picture. Assume, for instance, the viewport changes by two sub-pictures or tiles 24. Accordingly, four of the sub-pictures 24 of picture 16 change their originating sub-streams: two of these four which stem from the high resolution data stream 38a are now taken from one of the low resolution data streams 38c and 38d, and the other two sub-pictures 24 which originated from the low resolution data stream 38c, are now taken from of the low resolution data stream 38d. In particular, in order to reduce the time for encountering the next random access point, the low RAP distance version data stream 38b and 38d, respectively, is preliminarily used for these four sub-pictures 24. The four sub-pictures mentioned change their position within picture 16. All the other sub-pictures 24, however, remain being downloaded in the respective more efficient version of data stream 38a and 38c, respectively. They do not need and random access point. As a variant, it is noted that it might be that the composer/merger 14 would be allowed to insert into a data stream 10 for those sub-pictures 24 changing from high resolution to low resolution, the corresponding NAL units of the more efficiently coded input video data stream 38c with using down sampling from high resolution to low resolution in order to derive the reference pictures of the corresponding non-RAP sub-pictures of lower resolution.

That is, in this scenario example just-illustrated with respect to FIG. 1 in combination with FIG. 10, the following problem associated with 360° streaming has been illustrated. In particular, when a user joins a service, i.e., tunes-in into a service, i.e., seeks to see the panoramic video, a random access point picture is needed. That is, without the embodiments described later on, the compiled data stream 10 would involve that each sub-picture within the starting picture would be coded in a random access point manner. That is, all NAL units of that picture would have to be coded in a random access point manner. Speaking in HEVC language, they would have to be of the NAL unit type IDR, CRA or BLA, for instance. That is, without the embodiments described further below, the decoder would be obliged to encounter an RAP picture so as to start decoding. However, when a user switches the view port, as outlined before with respect to FIG. 10, since only some sub-bitstreams 32 are newly added to the subset of bitstreams 32 contributing to, or merged into, data stream 10, it would be very ineffective to involve all sub-bitstreams 32, i.e., even those remaining within the subset of contributing bitstreams, to have its sub-picture 24 in the starting picture coded in a random access point manner. Rather, as just-outlined with respect to FIG. 10, it would be advantageous if only some sub-picture bitstreams 32 had effectively a RAP and others didn't. This means, however, the following: the NAL unit types indicated in the NAL units 34' within data stream 10 would then have to be changed relative to their setting in the underlying NAL units 34. In particular, the NAL types of NAL units 34 of sub-pictures 24 of the starting picture which are set to IDR, CRA or BLA may not be associated with the same NAL unit type in the corresponding version 34' and data stream 10 as it would be a requirement of the data stream 10 that if one of the sub-picture bitstreams has one of these NAL unit types, all others would have to have the same NAL unit type. In particular, decoders defined so far would, when they find an IDR or CRA (with EOS NALU before) NAL unit for a certain access unit of data stream 10, i.e., for a certain picture 18 of video 16, restart the decoding process and flush its decoder picture buffer (DPB) as any picture there cannot or is not used for reference. This means that if, for example, the scenario described before, would be implemented by using HEVC for the data stream 10 in its current version, in merging sub-bitstreams 32 together, measures would have to be taken if for some picture 18 of video 16, not all contributing sub-bitstreams 32 contained a NAL unit type corresponding to a random access point coding, but merely a fraction thereof. Rather, in that case, the RAP NAL unit(s) within such a picture 18 would have to be rewritten into a non-RAP NAL unit which process also may use a change of other headers such as slice, tile and/or tile group headers as their content is dependent on whether the NAL unit in question is an RAP or not.

Therefore, the embodiment described next with respect to FIG. 2 seeks to improve the signaling of sub-picture RAPs beyond the technologies at hand so far. For instance, there are already proposals to move away from the just-outlined obligation to assign NAL unit types to the NAL units of a data stream in a manner so that the NAL type into which sub-pictures are coded, are constant within each picture. For instance, WO 2015/059194 already proposes to use a per NAL unit based signaling, e.g., in the NALU header, more specifically a dedicated NALU type to indicate a sub-picture random access point type or a recovering point SEI message containing substitutional information substituting all parameters needed to obtain an HEVC conformant data stream. However, solving the above-outlined problem in the manner proposed in the latter document still expects the composer/merger 14 to do cumbersome tasks of "stream translations" and accordingly, the embodiments outlined below seek to overcome this issue and seek to avoid the necessity for the composer/merger 14 to spend signaling overhead of additional RAP types.

Figure 2:
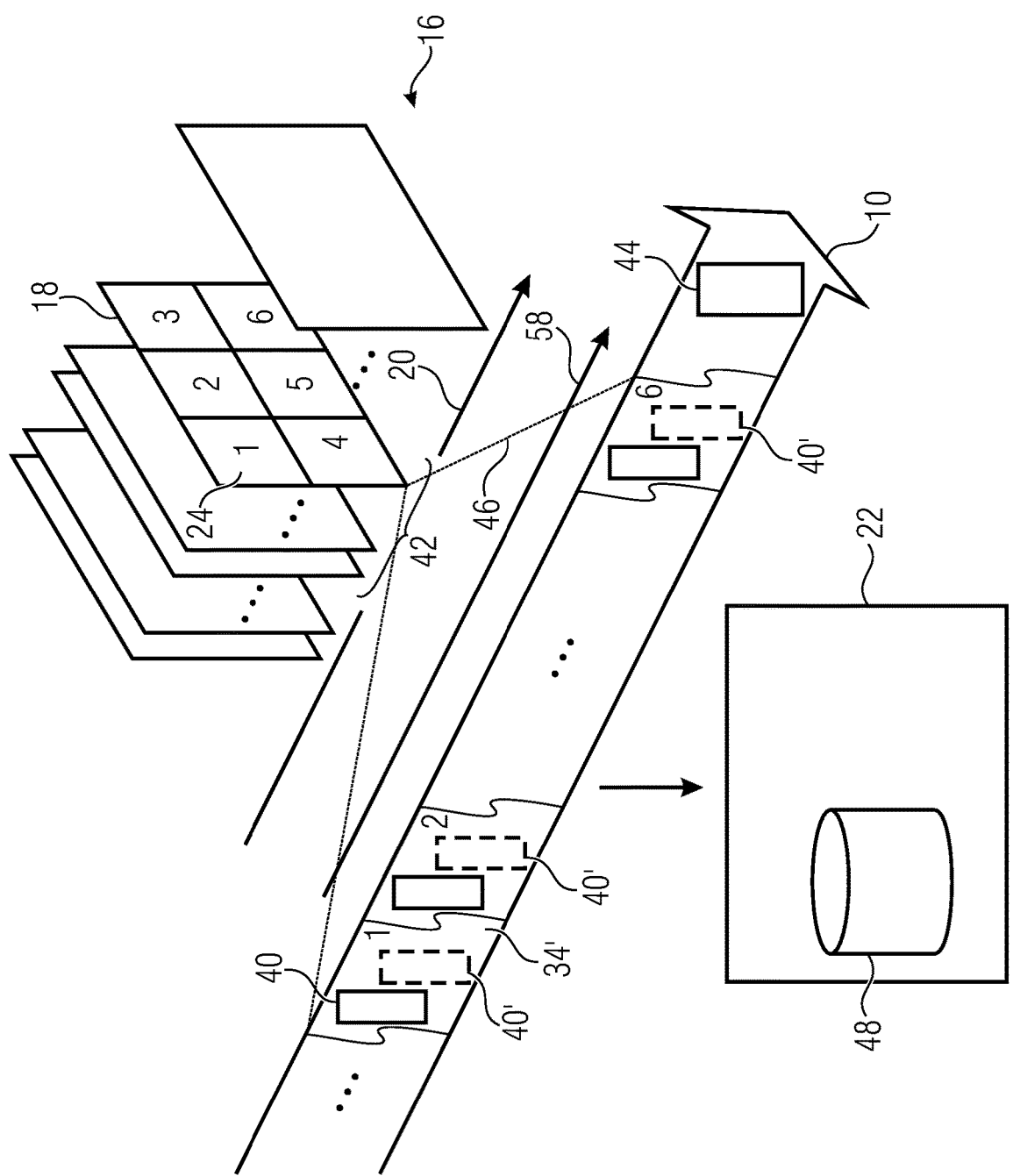
FIG. 2 shows a schematic diagram illustrating a video codec concept allowing an indication whether sub-picture granularity or picture granularity is used for random access point signalization.

FIG. 2 shows a concept for a video codec in accordance with an embodiment of the present application concerning the first aspect of the present application. FIG. 2 shows, insofar, an embodiment for a corresponding data stream 10 and a video decoder 22 which may conform to such a corresponding new video codec. The reference sign 10 of FIG. 1 has been re-used as the data stream 10 of FIG. 1 may correspond to the description now brought forward with respect to FIG. 2 with, consequently, allowing the problems outlined above to be addressed at least partially.

That is, the video decoder 22 of FIG. 2 receives a data stream 10 having a video of pictures encoded there into. The data stream 10 has the video encoded there into in a manner according to which sub-pictures into which the video pictures are spatially sub-divided, are encoded independently from each other. Each sub-picture is coded into respective one or more NAL units 34' of the data stream 10. That is, the NAL units 34' carry, inter alia, motion information and prediction residual information. It should be submitted that other than the description brought forward above with respect to FIG. 1, the sub-picture coding independency may only relate to sub-pictures within one picture 18 of the video coded into data stream 10. Accordingly, FIG. 2 shows exemplarily one picture 18, its subdivision into sub-pictures 24 and the corresponding NAL units 34' into which the sub-pictures 24 are coded within data stream 10. Naturally, the coding may also be done to yield separately coded sub-videos as outlined above with respect to FIG. 1.

The decoder 22 decodes from the data stream 10, for each sub-picture 24 of each picture 18, a sub-picture related information 40. The sub-picture related information for a certain sub-picture 24 may, for instance, be the syntax element indicating the NAL unit type of the one or more NAL units 34' into which the respective sub-picture 24 is coded. When assuming a first state, the sub-picture related information 40 identifies its sub-picture 24 as being coded into its one or more NAL units 34' in a random access point manner. That is, it forms a sub-picture random access. That is, the sub-picture would be coded into its one or more NAL units 34' in a self-contained manner without reference to any other sub-block. When assuming a second state, the sub-picture related information would identify its sub-picture 24 as not being coded in the random access point manner. That is, NAL units 34' having such sub-picture related information 40 may have its associated sub-block 24 coded therein using coding dependencies on other sub-blocks. In particular, the sub-picture related information 40 may comprise an integer-valued syntax element for each sub-picture 24 which discriminates between a plurality of NAL unit types a first subset of one or more NAL unit types of which corresponds to the first state, i.e., the sub-picture RAP state, and a second subset of one or more NAL unit types of which correspond to the second state, i.e., the non-RAP state.

However, the decoder 22 of FIG. 2 is further configured to read from data stream 10 with respect to a set 42 of one or more pictures, a random access point signaling granularity indication 44. It may be conveyed in data stream 10 as a sort of higher level signaling relating to more than just one picture. That is, in that case, the set 42 of one or more pictures 18 would comprise a sequence of pictures such as a GOP or the like or even the whole video 16. Indication 44 could be, for instance, comprised by a sequence parameter set or video parameter set of data stream 10. On the other hand, indication 44 could relate to one access unit, i.e., one picture 18 of video 16, only. In other words, set 42 could comprise one picture. Such a per-access unit signaling could be contained in a PPS, picture parameter set, of data stream 10 or an access unit delimiter or the like. This indication 44 would have at least two signalable states/granularities.

When assuming or signaling a first granularity, indication 44 would indicate that, for each picture 18 of the set 42 of one or more pictures, the sub-picture related information 40 assumes a common state for all sub-picture 24 of the respective picture 18. In other words, the sub-picture related information 40 would assume a state equal for all sub-pictures 24 within one picture 18 within set 42. The equality may even hold true when considering the level of NAL unit types. That is, the NAL unit type of NAL units 34' belonging to the sub-pictures 24 of one picture 18 may be expected to be the same, i.e., equal to each other, in case of the indication 44 signaling the first granularity, i.e., picture granularity.

If, however, indication 44 indicates a second granularity, which may be called a sub-picture granularity, this indicates that, for each picture 18 of set 42, the sub-picture related information 40 is allowed to assume different states for the sub-pictures 24 of the respective picture 18.

That is, the decoder of FIG. 2 would be able to decode from the data stream an indication 44 and decide, based thereon, as to whether the data stream 10 is of a type where the sub-picture related information 40 is expected to be the same within each picture 18, or whether the data stream 10 is of a type where the latter restriction is not the case. The decoder 22 may act differently depending on indication 44 in terms of one or more of the decoding tasks described in more detail below.

In any case, however, the aforementioned composer/merger 14 is able to exploit the possibility of setting indication 44 to the sub-picture granularity in the following manner: it may compose access units of data stream 10 by putting together NAL units 34 of a reservoir of coded sub-streams 32 which relate to temporally co-aligned sub-pictures 24 of the current picture which this access unit, such as 46 in FIG. 2, refers to and may, in doing so, take over or adopt or leave unamended the NAL unit's NAL unit types so that the NAL unit 34' in data stream 10 within this access unit 46 coincide, in the sub-picture related information 40, with the NAL units which were put together.

In the following, some embodiments are described which describe the functionality of the decoder 22 of FIG. 2 for the case that indication 44 indicates the sub-picture granularity. All these embodiments and the description thereof shall be understood, however, to also apply the decoders not configured to read or decode indication 44 from data stream 10. In other words, the subsequently explained embodiments shall not be restricted to the case that indication 44 is present in the data stream and that the decoder 22 is configured to read same from data stream 10. Rather, the subsequently explained embodiments of further aspects of the present application shall concurrently be interpreted as descriptions of decoders capable of treating with the fact that certain settings, such as the random access point coding or non-random access point coding of sub-pictures, varies within one picture. These decoders may, however, not have any specific alternative functionality as it is true with respect to the decoder 22 of FIG. 2 which acts differently depending on indication 44.

Briefly summarizing as to what has been described so far, FIG. 2 shows a concept where an additional indication 44 in data stream 10 such as a higher level signaling such as a signaling on coded video sequence level or even at bitstream level, i.e., for concatenation of coded video sequences, CVS, enables to reinterpret NAL unit level signaling such as the NAL unit type signaling as sub-picture random access indication. For instance, indication could be signaled in form of a flag which could be called sub_picture_random_access-_process_enabled_flag. When this flag would be equal to zero, for instance, the NAL unit types indicating random access functionality would be interpreted by decoder 22 as full-picture level random access. When the value of the flag would be equal to one, however, the respective NAL unit types would be interpreted as sub-picture random access points.

As an alternative, the indication 44 could be embodied as a per-access unit signaling. For instance, the access unit delimiter NAL unit could be used to indicate as to which type of random access is allowed in the access unit starting at that access unit delimiter NAL unit. A syntax element could be added to such access unit delimiter NAL unit that indicates one of the following states: 1) all sub-pictures 24 of the picture of the access unit to which the delimiter belongs contain a random access picture (IRAP), 2) some sub-pictures 24 may contain a random access picture (IRAP), 3) none of the sub-pictures 24 contain a random access picture (IRAP).

Using indication 44, a decoder can easily identify which kind of random access functionality can be applied to the picture(s) 18 of the set 42 which defines the scope of indication 44, i.e., the scope to which indication 44 relates, and whether one of the following processes described with respect to the following embodiments is to be carried out by the decoder 22 or not.

Before resuming the description of as to what decoder 22 does if indication 44 signals the sub-picture granularity, it should be noted that decoder 22 of FIG. 2 may be configured to identify the data stream 10 as a non-conforming data stream, i.e., one not conforming to the video codec, if the indication 44 indicates picture granularity and the sub-picture related information 40 assumes, for any picture 18 of set 42 to which indication 44 belongs, different states for different sub-pictures 24 of that picture.

Figure 3:
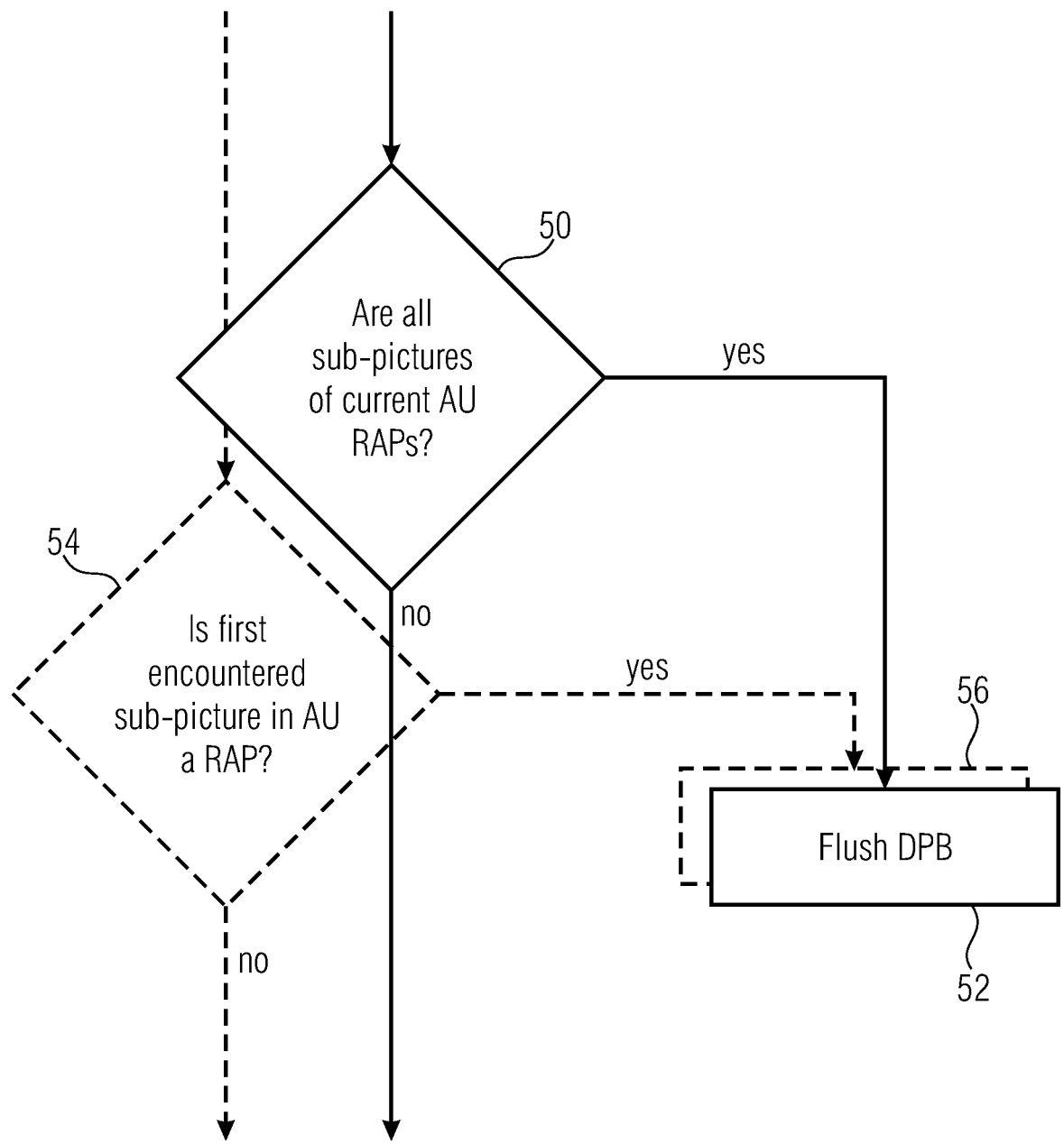
FIG. 3 shows a schematic flow diagram illustrating a possible functionality of a decoder for flushing its decoded picture buffer.

FIG. 3 shows an embodiment for a behavior of decoder 22 with respect to flushing its decoded picture buffer, i.e., the buffer within which reference pictures are buffered on the basis of which pictures yet to be decoded may be predicted. With continuous lines, FIG. 3 illustrates the functionality of decoder 22 for the sub-picture granularity case, while dashed lines show the corresponding functionality for the picture granularity case. Again, it should be noted that FIG. 3 shall, insofar, be treated as a description of both, an extension of the functionalities described with respect to the decoder described with respect to FIG. 2 which is able to decode indication 44 and act according to either modes depicted in FIG. 3, or a description of an alternative decoder 22 for the case where data stream 10 does not comprise indication 44 and where the decoder 22 acts according to the sub-picture granularity mode inevitably.

As shown in FIG. 3, a decoder 22 in accordance with the embodiment of FIG. 3 is configured to check, for a certain access unit or a for a certain picture 18, whether the sub-picture related information 40 assumes the random access point state for all sub-pictures 24 of that picture as shown at 50. If yes, i.e., responsive thereto, the decoder flushes its decoded picture buffer 48 at 52. Again, decoder 22 may apply this functionality of steps 50 and 52 for pictures 18 for which indication 44 indicates the sub-picture granularity, while applying the alternative approach illustrated by dashed lines in FIG. 3 in case of indication 44 indicating the picture granularity. In accordance with this alternative approach, decoder 22 checked, for a certain access unit or picture 18, whether the sub-picture related information 40 for the first encountered sub-picture 24 in the access unit or for the respective picture, a random access point coding at 54, and if yes, i.e., responsive thereto, the decoder flushes 56 the decoded picture buffer 48. The different behaviors of decoder 22 for flushing the decoded picture buffer 48 in case of indication 44 indicating the sub-picture granularity on the one hand and the picture-granularity on the other hand, may consequently also manifest itself in a different scheduling of the flushing of the decoded picture buffer at 52 or 56 relative to the times the decoder 22 starts decoding the individual NAL units 34' of that access unit 46 such as relative to the times the decoder 22 retrieves the NAL units 34' of access unit 46 from a coded picture buffer. While the flushing of the decoded picture buffer 48 in step 52, i.e., at sub-picture granularity domain, may take place at the time of decoding the last sub-picture's 24 one or more NAL units 34' in decoding order 58, when it is clear that all sub-pictures of the current access unit are random access points, flushing the decoded picture buffer 48 in case of step 56, i.e., in the picture granularity domain, may take place when decoding the first sub-picture's 24 one or more NAL units 34' in coding/decoding order 58, namely when it is clear that the sub-picture related information 40 present in the data stream for that sub-picture indicates random access point coding, i.e., even before decoding the second sub-picture 24 of the current picture or access unit in coding/decoding order 58. Again the functionalities explained with respect to FIG. 3 relating to the picture granularity mode may, in accordance with an alternative embodiment wherein indication 44 doesn't exist, not be implemented in the decoder 22.

That is, FIG. 3 explained an embodiment where the decoding process is changed to flush a decoded picture buffer 48 of the decoder 22 and perform random access point operations only when it is clear that all sub-pictures 24 in the data stream 10 for a certain picture are sub-picture random access points and therefore the whole picture is a random access point itself. Accordingly, the decoder 22 may be configured to decode up to the last NAL unit 34' in the current access unit to determine whether this access unit is a full random access point or not.

The embodiment for decoders described next with respect to FIG. 4 concentrates on a functionality/mode of operation of the decoder relating to the removal of individual reference pictures or pictures stored in the decoded picture buffer 48 no longer needed for pictures yet to be decoded. That is, while FIG. 3 concentrated on the flushing of the decoded picture buffer 48, i.e., the removal of all pictures currently buffered in the respective decoded picture buffer, FIG. 4 concentrates on another aspect where the data stream 10 may convey reference picture buffer description, i.e. information on reference pictures which are to remain in the decoded picture buffer 48 so as to serve as a possible basis for inter-prediction for pictures yet to be decoded. To this end, the data stream 10 conveys information on a set of reference pictures which information is updated on a per picture or per access unit basis. Similar to the sub-picture related information 40, this information on reference picture sets to be maintained in the decoded picture buffer for future use, namely the reference picture buffer description, is something which is signaled in the data stream 10 for each sub-picture 24, namely in its corresponding one or more NAL units 34'. In accordance with a variant depicted in FIG. 4 by use of continuous and dashed lines, this reference picture buffer description may be an information subject to similar constraints depending on indication 44 as has been described till now with respect to the sub-picture related information 40 which was for indicating RAP and non-RAP coding. Accordingly, the reference picture buffer description as indicated in FIG. 2 using reference sign 40' to illustrate the similarity in terms of restrictions depending on indication 44 or an similar indication which might be present alternative to or in addition to indication 44. In particular, the set of reference pictures indicated by buffer description 40' for the first sub-picture 24 of a certain picture 18 may be expected to be equal to the set of reference pictures indicated by buffer description 40' for any other sub-picture 24 of the same picture 18 or to at least include all reference pictures indicated by the reference picture buffer description 40' for the second and following sub-pictures of that picture 18 in coding/decoding order 58. In case of indication 44 (or the corresponding indication for reference picture buffering handling) indicating sub-picture granularity, the sets of reference picture sets indicated by the buffer description 40' for the various sub-pictures 24 of one picture 18 may be free to be different from each other in any manner, i.e. may indicate mutually different sets of reference pictures. Mutual difference means that the sub-pictures within one picture and their corresponding successor sub-pictures in the following pictures may use different reference pictures, i.e. different set of reference pictures, because of, for instance, their corresponding predecessor sub-pictures which are from the prediction references are contained in mutually different sets of reference pictures. Mutual correspondence of sub-pictures results from, for instance, their origin, i.e. they might have been separately coded into a corresponding sub-stream 32 as a sub-video 28. The latter freedom enables a composer/merger to compose a data stream 10 on the basis of NAL units 34 of a reservoir of sub-streams 32 by, in putting together such NAL units to form one access unit of data stream 10, simply taking over, without any modification, the reference picture buffer description 40' which would, thus, be equal among the NAL units 34' in the final data stream 10 on the one hand and the NAL units 34 in the reservoir of sub-streams 32 on the other hand.

Figure 4:
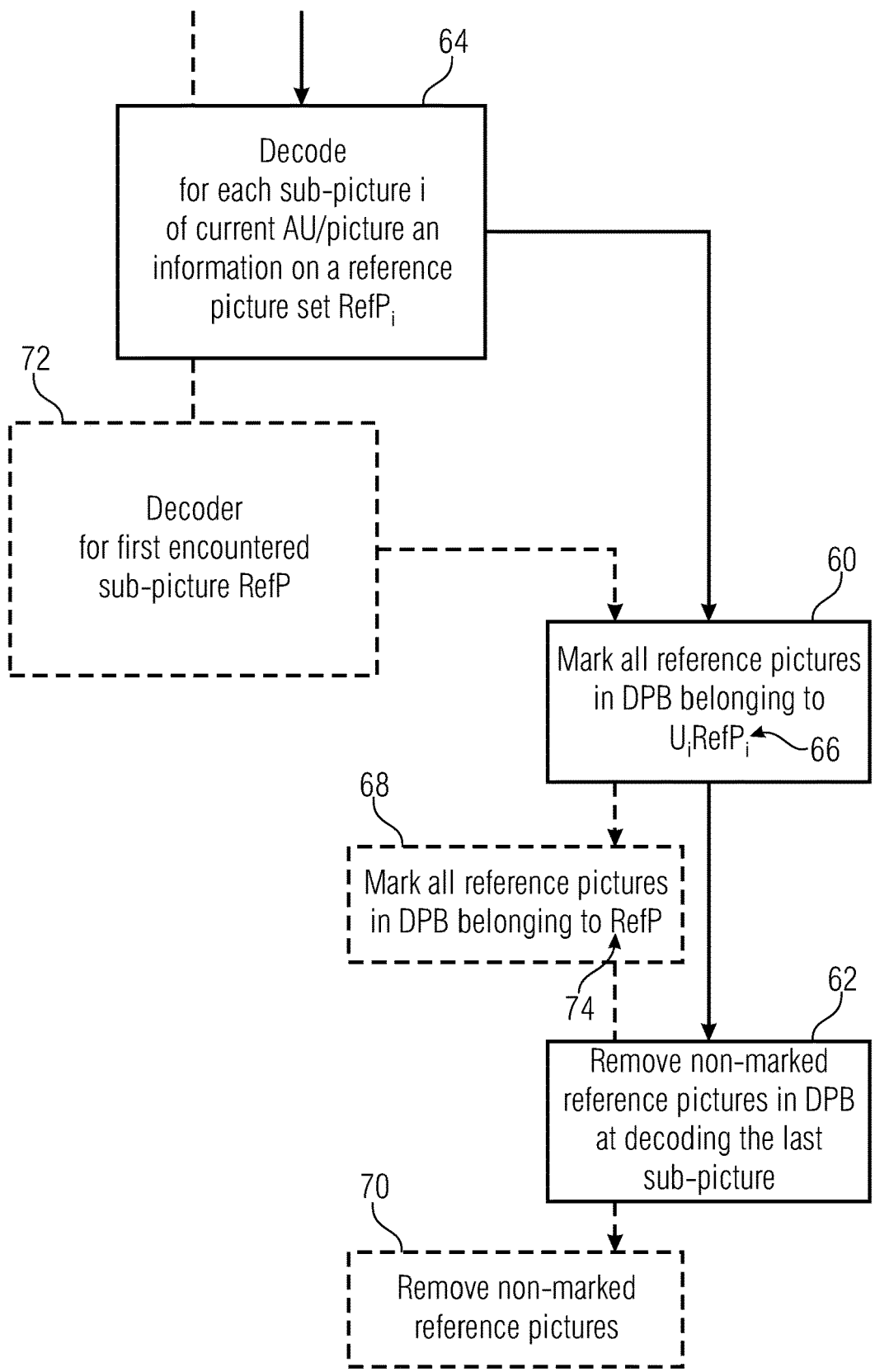
FIG. 4 shows a schematic flow diagram for illustrating a favorable functionality for a decoder in performing decoded picture buffer emptying.

Thus, before resuming the description of FIG. 4, this means that the data stream for embodiments of FIG. does not necessarily comprise the sub-picture related information 40. The embodiment described with respect to FIG. 2, may include the reference picture buffer description 40' or may not. Then, similar to the statement made above with respect to FIG. 3, the description of FIG. 4 may be interpreted as describing possible extensions/modifications of the embodiments described so far with respect to FIGS. 2 and 3 as well as self-contained embodiment where the decoder merely implements the functionality illustrated in FIG. 4 using the continuous lines. That is, in particular, an indication 44 may be not present in the data stream.

In accordance with FIG. 4, a decoder 22 is configured to perform picture removal from the decoded picture buffer 48 as follows. In particular, the decoder marks pictures in the decoded picture buffer 48 which are to remain in the decoded picture buffer 48 to serve as a prediction reference for pictures yet to be decoded at step 60 and removes 62 non-marked reference pictures in the decoded picture buffer 48 which are not marked and which are not needed for future display/output by the decoder, by cyclically performing these steps 60 and 62 for each picture. In order to perform the marking 60, however, the decoder decodes 64 for each sub-picture i of the current access unit or current picture buffer description 40' indicative of a reference picture set $RefP_i$. The pictures in the decoded buffer 48 to be marked in step 60 are then identified 66 by forming the union of sets $RefP_i$ for all sub-pictures of the current access unit or picture. As illustrated in FIG. 4, the removal of non-marked reference pictures in the decoded picture buffer at step 62 may, accordingly, take place at decoding the last-sub-picture 24 of the current access unit or picture in coding/decoding order 58. That is, the removal 62 may take place after parsing or after decoding all sub-pictures 24 of the current picture or at least after fetching all sub-pictures 28 or, to be more precise, all the NAL units 34' from the decoded picture buffer. Naturally, pictures not-marked are only removed if they are not needed for output, either because they are not output pictures or because they have already been output.

In case of a decoder 22 capable of operating in the sub-picture granularity mode described with respect to steps 60 to 66 as well as the picture granularity mode illustrated by dashed lines in FIG. 4, between which the decoder 22 may switch depending on indication 44, the decoder 22 may alternatively act as follows in removing pictures from the decoded picture buffer. In particular, when the picture granularity mode is active, the decoder 22 may still perform the marking 68 of reference pictures to be maintained in the decoded picture buffer 48 and the removal of non-marked reference pictures from the decoded picture buffer 48 in step 70 access unit/picture-wise but for sake of determining the reference pictures to be marked, and with respect to the scheduling of the removal 70, a different behavior may apply. In particular, the decoder may, in step 72, decode the buffer description informing on the set of reference pictures for the sub-picture 28 encountered first in coding/decoding order 58 and identify 74 the reference pictures to be marked in step 68 as that set, i.e., $RefP_1$ in case of the indices corresponding to the decoding/coding order. Naturally, the decoder 22 may also read/decode the reference picture buffer description 40' from the data stream 10 for other sub-pictures of the current access unit or of the current picture than the first in coding/decoding order 58, but this information is not used for the marking in step 68. Further, the removal of non-marked reference pictures at step 70 may take place before decoding the second sub-picture in coding/decoding order 58 or, differently speaking, after parsing or after decoding the first sub-picture in coding/decoding order 58. Naturally, pictures not-marked are only removed if they are not needed for output, either because they are not output pictures or because they have already been output.

If, in accordance with the just-mentioned possibility, the decoder 22 also reads the reference picture buffer description with respect to sub-pictures 28 other than the first one in coding/decoding order 58 for a certain access unit, the decoder 22 may configured to identify the data stream 10 as a non-conforming data stream in case of the set of reference pictures indicated by buffer description 40' for any sub-picture 28 other than the first one in coding/decoding order 58 comprises a reference picture which is not comprised by the set of reference pictures indicated by buffer description 40' for the first sub-picture 24 of that picture.

Figure 5:
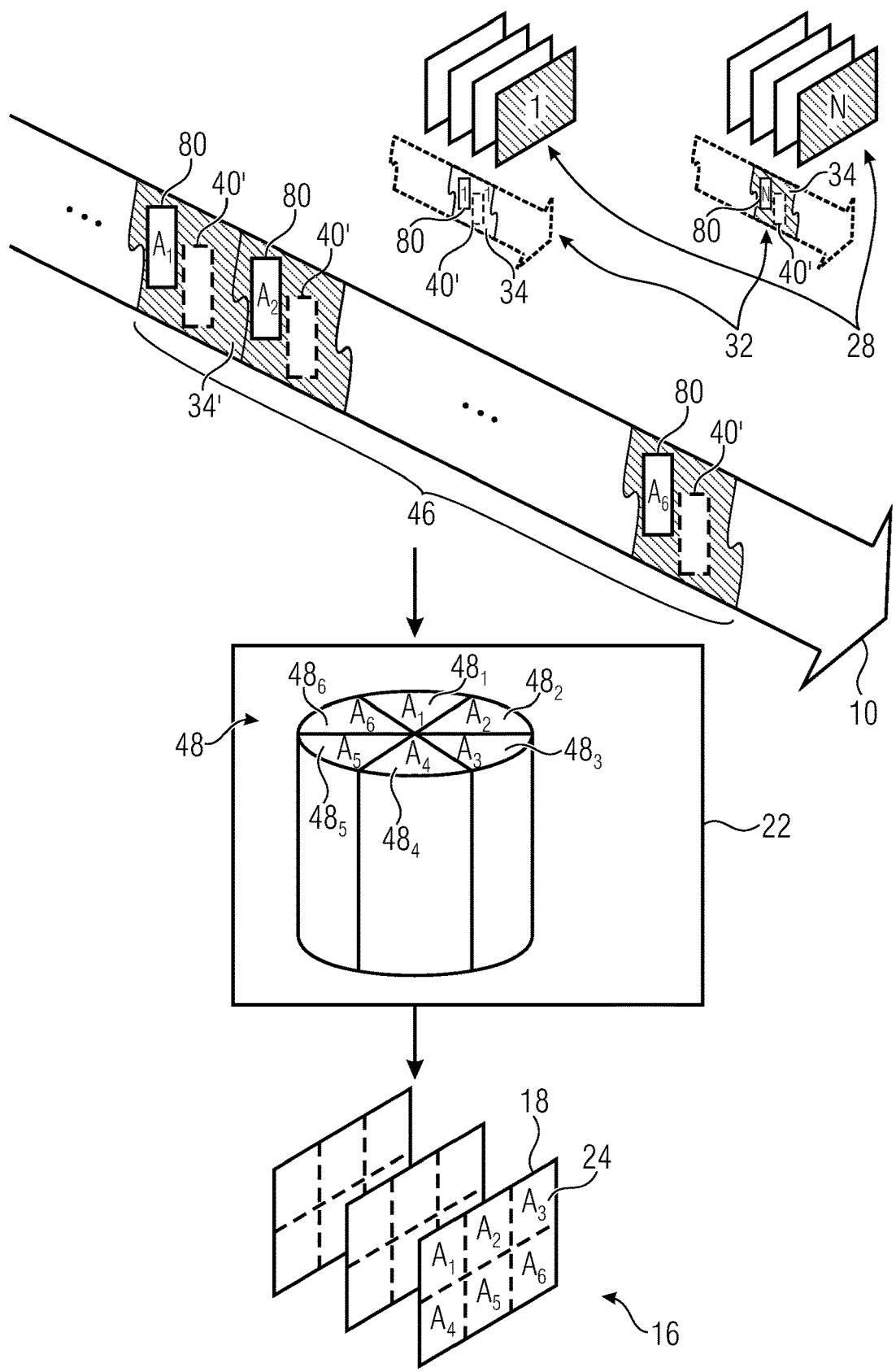
FIG. 5 shows a schematic diagram illustrating a decoder configured to perform decoded picture buffer emptying a units of sub-pictures.

FIG. 5 illustrates an alternative with respect to the concept outlined above with respect to FIG. 4. In accordance with FIG. 4, the decoded picture buffer 48 has been emptied in units of pictures. Measures have been taken in accordance with the sub-picture granularity mode, to remove only pictures not needed anymore, neither for output nor as a reference with respect to any of its sub-pictures. In accordance with the embodiment of FIG. 5, the decoder 22 is capable of performing the emptying of the decoded picture buffer 48 in units of sub-pictures 24. With respect to the possible combination of this embodiment with respect to the embodiments described before, the same mode as provided above with respect to FIG. 4 applies. That is, the embodiment described next with respect to FIG. 5 may be combined with the description of a decoder of FIG. 2 or FIG. 3, and accordingly, a decoder implemented according to FIG. 5 may, or may not, be configured to alternatively operate in a picture granularity mode such as, for instance, responsive to indication 44.

The concept according to FIG. 5 is as follows. In particular, the data stream 10 decoded by decoder 22 has the video 16 encoded there into in a manner so that the video pictures 18 are constantly sub-divided into co-aligned sub-pictures 24 coded in a manner so that spatially non-overlapping sub-pictures 24, or sub-picture belonging to different sub-videos, are coded independently from each other. Thus, the coding took place in sub-videos 28, thereby leading to reservoir of sub-streams 32. As explained above with respect to FIG. 1, each sub-stream 32 has a respective sub-video 28 encoded there into, each sub-video 28 comprising a certain sub-picture, i.e., a possible candidate for the sub-pictures 24 in pictures 18 of video 16 of data stream 10. The sub-streams 32 are encoded independently from each other. They contain, per sub-picture, 24, one or more NAL units 34. As part of the encoding process, the NAL unit 34 may already have been provided with a sub-picture identifier 80. That is, each NAL unit 34 may be tagged with such a sub-picture identifier 80 so as to enable a discrimination between the reservoir of sub-streams 32. As explained with respect to FIG. 1, merely a subset or, to be more precise, a proper subset of the reservoir of sub-streams 32 may have been elected in order to use their NAL units 34 which have a corresponding sub-picture of a current time stamp encoded there into, so as to form, by putting them together, an access unit 46 of data stream 10. In putting them together, the NAL unit 34' resulting in data stream 10 still have the sub-picture identifier 80 in there. In FIG. 5 this is illustrated in the following manner: the identifiers 80 of the reservoir of bitstreams 32 are discriminated by integers 1 . . . N. The pictures 18 of video 16 coded into data stream 10, have each six sub-pictures 24. For each sub-picture 24 within one picture 18, data stream 10 has, in the corresponding access unit 46, one or more NAL units 34' which are tagged using a sub-picture identifier $80A_i$ with i=1 . . . 6, with $A_i \in \{1 \ldots N\}$. Which sub-videos 28 or which sub-streams 32 are chosen for composing data stream 10 may depend on the application and may be constant or vary in time. In addition, each NAL unit 34 and their versions 34' by way of which data stream 10 is put together, is indicated as comprising the above-described reference picture buffer description 40'. As is clear owing to the separate encoding of sub-streams 32, this information 40' is different for different sub-streams 32.

In performing the emptying of the decoded picture buffer 48 in units of sub-pictures 24, decoder 22 acts as follows. Generally speaking, the decoder 22 decodes from the data stream 10, for a currently decoded picture 18, buffer description 40' on the set of reference pictures for each sub-picture 24 of the currently decoded picture 18. For each sub-picture 24 of the currently decoded picture 18, the decoder uses then the reference picture buffer description for the respective sub-picture 24 to identify those sub-pictures and the decoded picture buffer 48 ought to remain in the decoded picture buffer 48 which are spatially collocated to the respective sub-picture, i.e., belong to the same sub-video 28. The other sub-pictures are removed. The removal is, accordingly, done sub-picture-wise.

As depicted in FIG. 5, the video decoder may, to this end, split the decoder picture buffer 48 logically into sub-picture DPBs $48_1$ to $48_6$, one for each sub-picture 24 into which the pictures 18 of video 16 are spatially sub-divided currently. As a side, it shall be noted that the pictures 18 are illustrated in the figures of the present application to be sub-divided into six sub-pictures for illustration purposes only. Any other number may be feasible as well. Each of the sub-picture DPBs $48_i$ is used to buffer the sub-pictures 24 of the pictures 18 emerging from NAL unit 34' in data stream 10 tagged with a certain sub-picture identifier 80 which is associated with the respective sub-picture DPB. In other words, the decoder 22 associates each sub-picture DPB $48_i$ with a certain predetermined sub-picture identifier $A_i$ and accordingly, each sub-picture DPB $48_i$ is used, exclusively, for buffering sub-pictures of previously coded pictures 18 coded by NAL units 34' tagged with a sub-picture identifier 80 equal to that predetermined sub-picture identifier $A_i$. For a currently decoded picture, the decoder 22 does the following: for each sub-picture DPB $48_i$, the decoder 22 inspects whether the currently decoded picture 18 contains a corresponding sub-picture 24 the sub-picture identifier 80 of which equals the predetermined sub-picture identifier $A_i$ associated with the respective sub-picture DPB $48_i$ and, if so, uses the set of reference pictures indicated for the corresponding sub-picture by the latter's buffer description 40' to identify those sub-pictures in the respective sub-picture DPB $48_i$ ought to remain in that sub-picture DPB $48_i$ and the decoded picture buffer 48, respectively. All of these sub-pictures which are in that sub-picture DPB $48_i$ belong to the same sub-video 28 by virtue of collecting in that sub-picture DPB $48_i$ merely those sub-pictures coded into NAL units 34' tagged with a certain distinguishable sub-picture identifier. If, however, for a certain sub-picture DPB $48_i$, no NAL unit 34' is present in the current access unit and, accordingly, no corresponding sub-picture 24 is contained in the current picture 18, then the decoder 22 flushes the corresponding sub-picture DPB $48_i$ and reassigns the respective sub-picture DPB $48_i$ to another predetermined sub-picture identifier of a non-corresponding sub-picture 24 of the currently decoded picture 18 which is unequal to the predetermine sub-picture identifiers of all sub-picture DPBs $48_1$ to $48_6$. Instead of flushing, depending on the application, the decoder might, instead of flushing reassigned sub-picture DPBs, subject the sub-pictures contained therein to a sub-sampling or the like in order to reuse the reference sub-pictures contained therein as reference sub-pictures for the sub-pictures 24 of the predetermined sub-picture identifier to which the sub-picture DPB has been reassigned.

Before proceeding with the description of the present application with a description of further embodiments, the embodiments outlined above with respect to FIGS. 4 and 5 shall briefly be summarized again in other words. In particular, while FIG. 4 presented a concept of full picture dumping, FIG. 5 represented an embodiment for partial picture dumping. Both embodiments have in common that they deal with situations where decoded picture buffer emptying is performed not responsive to random access points, but responsive to reference picture buffer descriptions, i.e. information on reference pictures/sub-pictures no longer needed for reference. As explained above, random access points are not the only case where picture information is determined not be required any longer for reference and therefore can be (if already output) removed from the respective decoded picture buffer. In AVC or HEVC, pictures in the decoded picture buffer are marked as "used for reference" or "not used for reference" during the decoding process. In HEVC, for instance, there is signaling for what is called reference picture set (RPS). The RPS indicates which pictures in the decoded picture buffer are used for reference for the current pictures or for pictures following in decoding order, i.e., RPS (RefP) signals which picture to mark as used for reference. Those, not appearing in the RPS are marked as "not used for reference" and therefore can be removed from the decoded picture buffer if it is not needed for output (e.g., already output).

As discussed above, for 360° where only some tiles/sub-pictures are switched from high to low-resolution or vice versa, a random access point may be aligned as reference pictures might be different.

As for the RAP case, in cases where several bitstreams were stitched together, i.e., converted into sub-picture bitstreams of a new bitstream 10, the RPS would be needed to be rewritten which process would lead to an increased complexity for such an operation to be performed by composer/merger 14.

New video codecs might have different ways of marking reference pictures, but the problem will always apply: different references may apply for different sub-pictures within the bitstreams and if the marking processes done for the first slice/tile of an access unit as shown using dashed lines in FIG. 4, and this needs to convey all the information for all slices/tiles in the access unit, then the rewriting of the headers would be needed when the streams are merged together.

The idea of the embodiments of FIGS. 4 and 5 is, therefore, to change the process of reference picture marking in order to allow sub-picture random access or sub-picture feeding and removal with respect to the decoded picture buffer.

In accordance with the embodiment of FIG. 4, the decoded picture buffer removal is still done in units of pictures, but sub-picture random access is still allowed. In accordance with a possibility of implementing the embodiment of FIG. 4, a signaling on sequence or picture level, such as indication 44, defines whether the marking process is carried out in the picture granularity manner illustrated using dashed lines in FIG. 4, or whether it is carried out only after the last sub-picture in the current access unit, such as after parsing or after decoding the last sub-picture's NAL unit or slice or tile in the current access unit. The signaling switching between both methods could be included at a parameter set such as an SPS or PPS in form of a sub_picture_management_process_enabled_flag.

In case of the sub-picture handling, which, as outlined above, could be the only mode with a switching between both mode being left off, the process could, in accordance with an implementation example, comprise generating a temporal marked picture list for each sub-picture 24 of the current picture 18 wherein, at the end, it is checked which one is marked as "not used for reference". For example, using the RPS signaling 40' from HEVC as an example for reference picture indication, one could use the following pseudo code in order to identify the pictures that ought to remain in the decoded picture buffer:

---

N=number of pic in DPB.
Mark N pics as "not used for reference"
For i=0...NumSubPicBitstream
{
    If Pic in active RPS => mark that picture as "as used for reference"
}

---

When all sub-picture bitstreams are decoded for the current access unit remove from the DPB all pictures marked as "not used for reference" and already output.

In comparison with the approach of rewriting all RPS information, this approach may use, however, more memory in the decoded picture buffer.

In an alternative implementation of the embodiment of FIG. 4 with respect to the sub-picture DPB removal mode, a first process is carried out at each picture start, i.e., when processing the first slice/tile or sub-picture, by marking all pictures as "not used for reference" while, in addition, for each slice/tile/sub-picture parsed, another process is carried out marking slice/tile/sub-picture-wise indicated pictures as "used for reference". Reference picture dumping according the final result, i.e., at parsing/decoding the last slice/tile/sub-picture is carried out after the reference picture was already output and all slices/tiles/sub-pictures of the current picture are passed/received.

FIG. 5 pertains to the case where the content is encoded with motion-constraint tiles, i.e., MCTS, or, more generally speaking, sub-pictures independently coded from spatially offset sub-pictures or sub-pictures belonging to different sub-videos, which sub-pictures comprises not only ones of the same picture but also ones of other pictures. In such cases, it is possible to mark sub-picture specific regions using a sub-picture identifier so that they can be removed from the decoded picture buffer. A MCTS encoded bitstream can only reference itself.

In FIG. 5, use has been made of the possibility to mark the sub-picture regions of the pictures 18 separately. If a sub-picture was marked as "not used for reference" and that picture was already output, that region could be removed from the decoded picture buffer. Thus, it would be possible to run the process of marking separately for each sub-picture while parsing the NAL unit type and RPS at the slice/tile group or sub-picture header without having to wait until parsing all NAL units of an access unit.

This is done in accordance with FIG. 5, by initializing multiple sub-picture DPBs $48_i$ based on information in e.g., some parameter set conveyed in the data stream, or by re-assignment of sub-picture DPBs or by allocating DPB space for each newly occurring sub-picture identifier (for each new sub-video). After initialization, pictures (meaning reconstructed samples and corresponding referenceable data for prediction such as motion vectors) would be stored in the sub-picture DPBs $48_i$ corresponding to the sub-picture identifier $A_i$. The sub-picture identifier $A_i$ could, for instance, be one tile group ID.

Then, the reference picture set, i.e., a list that indicates which pictures need to be kept for prediction in the decoded picture buffer 48 together with a corresponding ID would be parsed and it would influence whether a sub-picture in its corresponding sub-picture DPB could be removed. Obviously, in some scenarios, the tile setup within a picture might change. E.g., in sub-picture bitstream merging scenarios, it could happen that for some time sub-picture with ID 0 and 1 are merged together and afterwards sub-pictures with ID 1 and 2 are merged together. In such a case, the sub-picture DPBs are flushed based on the parameter set indication. Whenever the parameter set that is activated does not contain a previous sub-picture ID, the sub-picture DPB corresponding to that sub-picture is flushed. Obviously, the removing of pictures is only done if the pictures are not intended for output, i.e., they have been already output or they are not needed anymore for output.

Several notes shall be made with respect to FIGS. 4 and 5. For instance, other than described above with respect to FIG. 5, it could be that the management of the sub-picture DPBs could be varied to the extent that the number of sub-picture DPBs managed concurrently exceeds the number of sub-pictures 24 in pictures 18 of video 16. For instance, for each sub-pictures identifier 80 encountered in the reservoir of sub-streams 32 or, to be more precise, encountered in data stream 10, decoder 22 could provide a separate sub-pictures DPB.

Further, it is noted that the description of FIG. 5 concentrated on the sub-picture granularity handling with respect decoded picture buffer emptying. However, while FIG. 5, thus, describes a decoder which could act accordingly, FIG. 5 is also to be seen as a description of a decoder which is capable of acting in the manner shown in FIG. 5, i.e., in a sub-picture handling mode, as well as in a picture wise handling mode such as responsive to an indication 44 shown in FIG. 2 or some equivalent signalization. In that case, the decoder 22 of FIG. 5 could manage the decoded picture buffer 48 picture-wise in the manner depicted in FIG. 4 using dashed lines.

As to the buffer descriptions 40' mentioned above, it should be noted that they might indicate the reference pictures ought to remain in the DPB in any manner such as in form of a list, in from of an analytical term indicating corresponding reference pictures such as by way of their POCs or the like. The buffer descriptions 40' may positively cite these pictures or may cite those pictures out to be removed from the DPB.

Further, FIGS. 4 and 5 concentrated on the emptying of the decoded picture buffer, but it is clear that decoder 22 of these figures fills the decoded picture buffer using just-decoded picture content. For instance, the filling of the decoded picture buffer 48 in case of FIG. 4 could be done picture-wise in case of sub-picture handling or in both cases, sub-picture handling and picture-wise handling. In FIG. 5, which concentrates on the sub-picture-wise DBP emptying, the filling could be done also sub-picture-wise, as soon as a certain sub-picture has been decoded, it is inserted into its corresponding sub-picture DPB. Naturally, an alternative approach could be that the filling of the decoded picture buffer 48 would be done picture-by-picture, i.e., the decoded sub-pictures 24 of the currently decoded picture 18 would be inserted into their corresponding sub-picture DPBs concurrently at the end of decoding the current picture 18. In case of the picture-wise DPB emptying mode, the decoder of FIG. 5 could act as the one being in the corresponding mode of FIG. 4 (i.e. es shown in dashed lines in FIG. 4).

Figure 6:
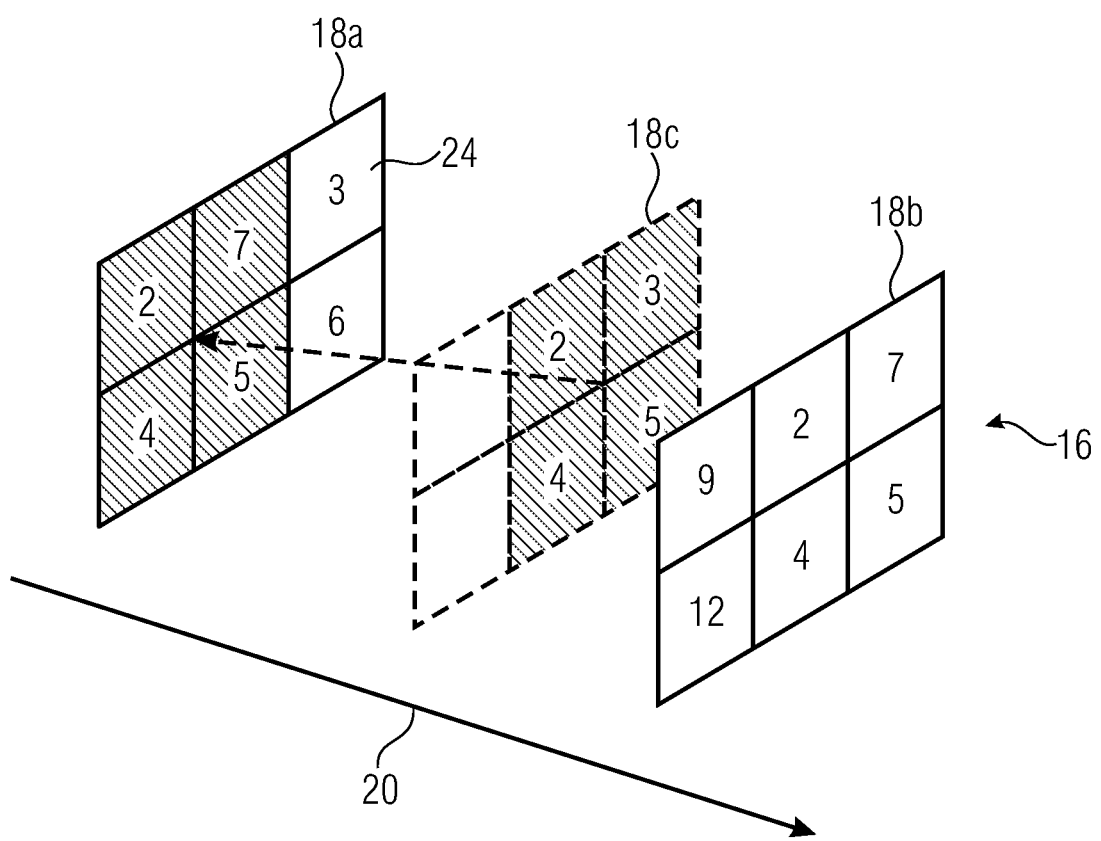
FIG. 6 shows a schematic diagram illustrating possible measures for addressing sub-picture rearrangement of sub-pictures belonging to continuous sub-videos within the pictures of a composed video data stream.

Further, some brief notes shall be made with respect to the above-described embodiments relating to decoded picture buffer handling. In particular, till now, it has been mentioned that sub-pictures 24 of pictures 18 of video 16 may be coded like sub-videos in a manner so that sub-pictures may depend on other sub-pictures of other pictures as long as they belong to the same sub-video, but independent from any other sub-pictures, i.e., other sub-pictures of the same picture 18 and sub-pictures of other pictures 18 which belong to different sub-videos. It might be that such sub-pictures belonging to the same sub-video change the sub-picture position within the pictures 18 of video 16 in time. FIG. 6 illustrates this case. Different possibilities exist in order to deal with such a circumstance. In FIG. 6, two pictures 18 of video 16 are exemplarily shown. In one picture 18, sub-pictures 24 belonging to the sub-video with sub-picture ID 2, 7, 3, 4, 5 and 6 are present. In a subsequent picture, it is visible that sub-pictures 24 of sub-videos with sub-picture ID 2, 7, 4 and 5 are still present, but at different sub-picture positions. Instead of sub-pictures 24 with sub-picture ID 3 and 6, two new sub-pictures or, to be more precise, sub-pictures of a new sub-picture ID, namely 9 and 12, are present in the latter picture.

Let's now assume that the sub-pictures 24 of the latter picture 18b which belong to those sub-picture identifiers which also occur in the previous picture 18a, are not coded in a random access point manner and, additionally, reference the sub-pictures of picture 18a. That is, the correct sub-pictures 24 of picture 18a would be present in the decoded picture buffer 48 of the decoder 28 at the time of decoding picture 18b, but measures need to be taken in order to perform the referencing, i.e. the motion compensated prediction, correctly for performing the prediction with respect to the decoding of the sub-pictures 24 of picture 18b of these sub-picture identifiers.

One possibility in order to solve this issue could be that the composer/merger 14 attends to such circumstances. He could use the technique presented in WO 2016/026526 according to which no-output pictures 18c are inserted into the data stream 10 by the composer/merger 14 which, by use of a motion vector field which is piece-wise constant, namely constant within each sub-picture position, rearranges the picture content of such a picture 18a so that the sub-pictures 24 still needed in a subsequent picture 18b are arranged at their new sub-picture positions which they assume in this subsequent picture 18b. Further, the composer/merge 14 takes care that, for such picture 18b, the referencing of picture 18a as a reference picture is redirected so as to declare picture 18c as the reference picture, instead. Further, motion vector prediction should be prohibited for the sub-pictures 24 of picture 18b which belong to these sub-videos the sub-pictures of which, which were present in picture 18a, were redirected by the no-output picture 18c.

Another possibility would be that the decoder 22 rearranges its pictures in the decoded picture buffer in order to generate new rearranged reference pictures as sub-pictures change their sub-picture position such as the sub-pictures of picture 18b of sub-picture ID 2, 7, 4 and 5 in FIG. 6. According to such a procedure, reference pictures in the decoded picture buffer would be spatially divided into their sub-pictures and the sub-pictures would be rescrambled. As outlined above with respect to FIG. 1, such handling could also involve a spatial resampling in case certain sub-pictures 24 in picture 18b are indicated to belong to the same picture content, with having, however, reduced spatial resolution compared to sub-pictures of previous pictures such as picture 18a. In this manner, the transition from a sub-picture layout in a picture 18a to a sub-picture layout in a new picture 18b could be taken into account without the insertion of output pictures 18c.

And an even further alternative could be that the decoder 22 redirects the motion vectors used to code the sub-pictures of picture 18b. The decoder 22 could generate motion vector offsets for the motion vectors of the rearranged sub-pictures in picture 18b to compensate for the sub-picture position change relative to the reference picture 18a. The motion vector offset is, in motion compensated prediction involved in decoding sub-pictures 24 of picture 18b, added to the coded motion vectors of the sub-streams belonging to sub-pictures 24 of picture 18b or, to be more precise, of those sub-streams the sub-pictures of which are also present in picture 18a. Thereby, the correct predictor of the inter-predicted blocks of these sub-pictures in picture 18a are derived which point to the correct position in the reference picture 18a, namely correct positions within sub-pictures belonging to those sub-videos shown in both pictures 18a and 18b, but at different sub-picture positions.

The sub-picture rearranging in the decoded picture buffer with respect to reference pictures and the motion vector redirection possibly performed by decoder 22 could be triggered by an observed change in the sub-picture identifier association to the individual sub-picture positions within the pictures 18 of video 16 which association describes the sub-picture rearrangement of the reference pictures and their sub-pictures in the data stream 10 accordingly. Alternatively, these processes could be triggered by an explicit data stream indication in data stream 10 written into the data stream by the composer/merger 14, for instance such as within the PPS.

Figure 7:
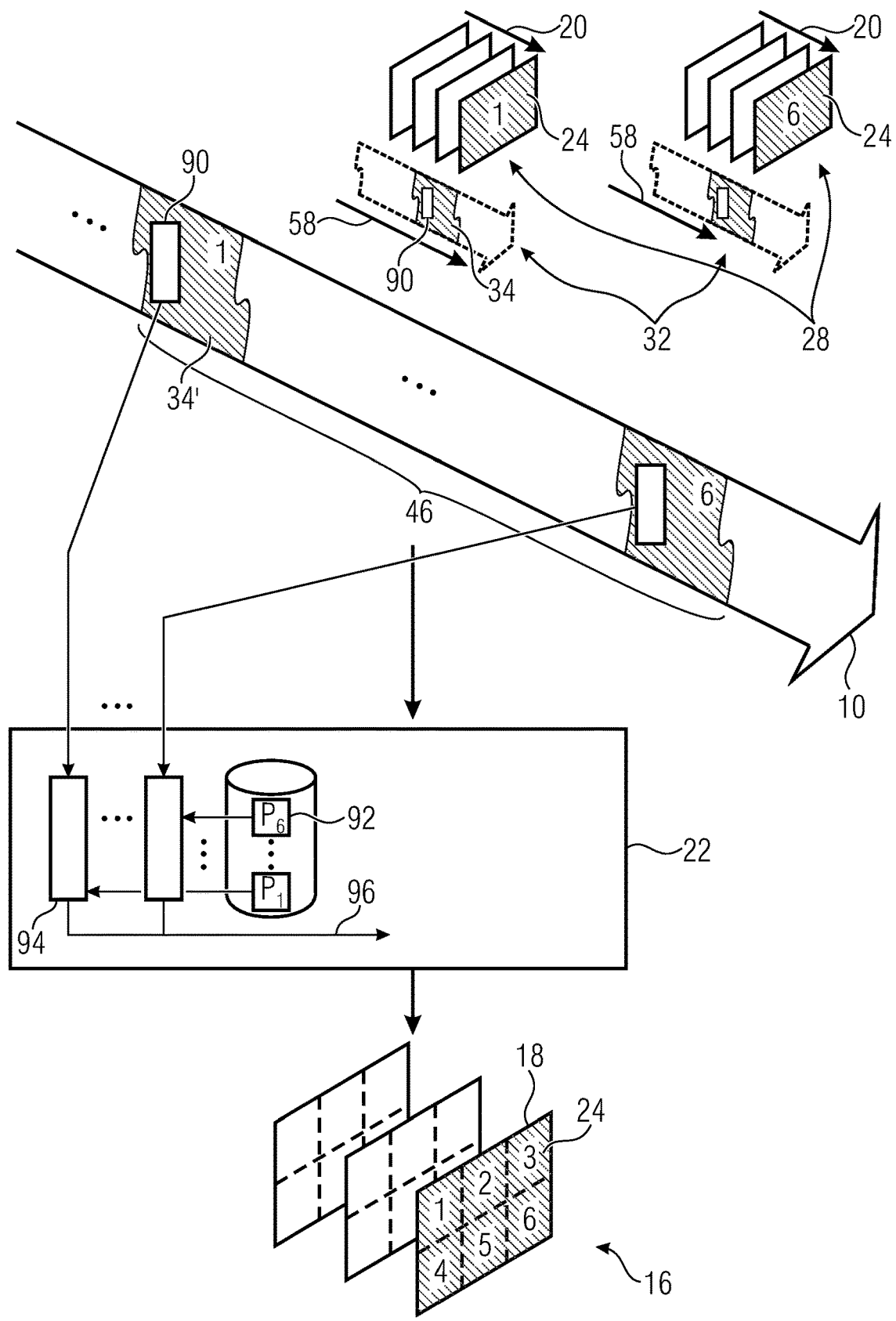
FIG. 7 shows a schematic diagram illustrating favorable measures for a video decoder in order to handle different POC domains for different sub-pictures of the video.

The embodiment described next with respect to FIG. 7 aims at describing a video codec environment which alleviates applications such as those described above with respect to FIG. 1, in terms of POC (picture order count) handling. FIG. 7, thus, describes a possible functionality of a decoder for treating data streams having a video encoded there into where the pictures 18 are subdivided into sub-pictures 24 and where the sub-pictures 24 are coded as parts of sub-videos 28 separate from each other as it was described with respect to the above figures such as with respect to FIG. 5. The functionalities described with respect to FIG. 7 may be a certain mode of the decoder 22 which is triggered, for instance, by a sub-picture indication such as by indication 44 described with respect to FIG. 2. In particular, FIG. 7 allows for different POC values to be transmitted in the data stream 10 for the sub-pictures 24 of pictures 18 so that different POC values occur even within one picture 18. If the functionality of FIG. 7 would only represent one mode of the decoder 22, the other mode could be that only one POC value is allowed for one picture 18.

If a data stream 10 is composed on the basis of a reservoir of sub-streams 32 as described above with respect to FIG. 1, for instance, it may happen that the picture order count development of the sub-pictures 24 within the corresponding sub-videos 28 in presentation time order 20 differs. For instance, the difference may stem from a different frame rate between the sub-videos 24. The video 16 would, naturally, have the minimum frame rate of sub-videos 28 contributing to video 16. Accordingly, corresponding pictures of a higher-frame rate sub-video 28 would have to be skipped by the composer/merger 14 in composing data stream 10. In encoding such a higher-frame rate sub-video 28 into its corresponding sub-stream 32, the encoding process would, naturally, have to take care that such pictures are not needed as reference pictures for other P or B pictures ought to remain and contribute to the composition of video 16 along with the sub-pictures 24 of the lower frame rate sub-videos 28. Additionally or alternatively, such difference in temporal development of the picture order count values of sub-pictures 24 in the various sub-videos 28 and the corresponding sub-streams 32, respectively, may stem from different GOP structures underlying these sub-streams 32. For instance, a different GOP length, i.e., a different number of sub-pictures 24 per GOP may apply for different sub-streams 32. Naturally, the generation/encoding process for yielding sub-streams 32 should be done in such a manner that, at least as far as those sub-pictures 24 of the corresponding sub-videos 28 are concerned, which contribute to the composition of pictures 18 of video 16, coincide in their sequential order within its respective sub-video 28 and sub-stream 32, respectively, in terms of both presentation time order 20 as well as coding/decoding order 58.

FIG. 7, thus, shows that the one or more NAL units 34 having sub-pictures 24 of the sub-videos 28 encoded there into, which are elected by the composer/merger 14 so as to be used to participate in a corresponding access unit 46 of data stream 10, by putting them together, are provided with a POC value 90. The POC value orders the sub-pictures 24 within its respective sub-video 28 in presentation time order 20 on, for instance, a GOP (group of pictures) basis. That is, it might be that the GOP values 90 within the NAL units 34 start the order anew every time a new GOP is started. Preferably, the concept of FIG. 7 allows for a composer/merger 14 to simply take over, without modification, the POC values 90 when putting together the NAL units 34 of the contributing sub-streams 32 to result into corresponding NAL units 34' in the access units 46 of data stream 10. By hatching, FIG. 7 illustrates sub-pictures 24 of the various sub-videos 28 and their corresponding NAL units 34 within the corresponding sub-streams 32 which correspond to one common time instant and one common coding/decoding rank in terms of coding/decoding order 58 so as to form together a corresponding access unit 46 in stream 10. In order to account for the differences in POC values 90 between the NAL units 34' corresponding to different sub-pictures of a currently decoded picture 18 or a currently decoded access unit 46, the decoder 22 acts as follows. In particular, the decoder 22 decodes from the data stream, for each sub-picture 24 of a currently decoded picture 18, the POC values 90 contained in the NAL unit 34'. Further, the decoder 22 manages, for each sub-picture 24 of the currently decoded picture 18 or, to be more precise, for each sub-video 28 which the pictures 24 in the currently decoded picture 18 stem from, one or more inter-sub-picture POC compensation parameters 92 ought to parameterize a POC correction function 94 which, when applied to the POC values 90 of the corresponding sub-video 28, yield final POC values 96 which are the same for each picture 18 of video 16. In accordance with an example, it might be that POC values 90 carried by NAL units 34' within one access unit 46 of data stream differ because of a different GOP length used for the coding of the sub-videos to which the sub-pictures 24 belong which are coded into these NAL units 34'. In that case, as long as the contributing sub-videos 28 and sub-streams 32 are not changed during the composition/merging, the mutual offset between POC values 90 within one access unit 46 tends to be constant over consecutive access units 46 and data stream 10 as long as none of the contributing sub-streams' 32 GOPs is starts a new GOP. The inter-sub-picture POC compensation parameters 92 may comprise, for instance, a POC compensation offset which is added by function 94 to the POC value 90 of the corresponding sub-video in order to account for the difference among the various sub-streams 32 of the current sub-picture 24 of the corresponding sub-video 28 to the most recent start of the GOP, i.e., the IRAP sub-picture 24 within its sub-video 28. Whenever a new sub-video 28 starts contributing to pictures 18 of video 16 or one of the running sub-videos 28 starts a new GOP by having a sub-picture for which the information 40 signals a RAP, decoder 22 updates or computes or resets the POC compensation offset of that sub-video or sub-stream 32, respectively, based on a comparison, i.e., by computing a difference, with any of the final POC value 96 of any sub-video 28 or sub-stream 32 still maintained in video 16 at that point in time, i.e. in the same access unit 46, and not having any random access point coding there. Owing to a frame rate difference between sub-streams 32, the inter-sub-picture POC compensation parameters 92 may also comprise a factor by which the POC values 90 are scaled using function 94 to yield the final POC values 96. Owing to such frame rate difference, the mutual difference between the POC values 90 within the access units 46 of data stream 10 tends to, after being offset compensated using the aforementioned POC compensation offsets, be related by a mutual difference of the POC values 90 which temporally scales according to a POC step size difference. This scaled difference is compensated by inverse scaling these POC values. The decoder 22 may derive such scaling factors as part of parameters 92 from the data stream 10 which may have been written there into by composer/merger 14 on the basis of an evaluation of the frame rates underlying sub-videos 28 and the corresponding sub-streams 32, respectively.

Thus, briefly summarizing, the decoder 22 may mange POC compensation parameters 92 to parameterize functions 94. Thus, parameterized, the functions 94 yield, when applied to the POC value 90 corresponding to a certain sub-picture 24 of a current picture 18, a final POC value 96. The final POC values 96 obtained in this manner, are equal to each other for each picture 18 of video 16. The offsets among parameters 92 may be updated by decoder 22 at random access point sub-pictures 24 in the manner described above, provided that a non-RAP sub-picture 24 is present in that picture 18 or access unit 46, respectively. If all sub-pictures 24 of a current picture 18 are random access point coded, then decoder 22 may set the offsets to any default value equal for the sub-pictures 24. Additionally or alternatively, RAP sub-pictures may, per se, such as by appropriately parametrizing the encoder 30, set to the same default POC value. This value may be zero. The decoder wouldn't have to do anything under this encoder constraint. It might be, however, that the encoder 30 would be free to set POCs of RAP sub-pictures 24 of one picture 18 to different values, and for such cases, the decoder might be configured to set the POC values of these RAP sub-pictures to a default POC value such as zero or to a value equaling the POC value 90 signaled for the first encountered RAP sub-picture. The scaling factors among parameters 92 may be determined by decoder 22 each time a sub-video 28 newly contributes to the composition of video 16.

As further outlined below, the decoder 22 may have to take care that motion vector predictor scaling performed by decoder 22 so as to hold the sub-pictures 24 from the corresponding NAL units 34' is performed correctly. Motion predictor scaling is done when a motion vector predictor relating to a reference picture A having a POC distance a to the picture comprising the block for which the respective motion vector predictor has been used, is scaled to refer to some need POC distance b for a currently predicted block of a current picture. As the scaling is ought to be performed with respect to the POC distance relating to the POC definition of the respective sub-stream 32, this scaling might have to be done by decoder 22 still on the basis of the individual sub-stream's POC values 90. In accordance with the HEVC motion vector predictor scaling, for instance, a different motion vector scaling may, otherwise, result if the frame rate scale factor among parameters 92 was not a power of two.

As already mentioned above, the embodiments described above may be combined with each other. This is not only true by combining each of the embodiment described with respect to FIGS. 3, 4, 5 and 7 with the embodiment of FIG. 2, but also with respect to a combination among the embodiments described with respect to FIGS. 3, 4, 5 and 7 among each other in pairs, triplets or all of them. Each of these concepts alleviate the usage of the resulting video codec concept in fulfilling the task of video composition/merging outlined with respect to FIG. 1. Naturally, the example outlined in FIG. 1 should not be treated as being limiting for the video coding codec examples set out in the above embodiments.

Before starting with the description of a further embodiment of the present application which is concerned with a further aspect of the present application which relates to a slightly different topic, namely gradual decoding refresh, the embodiment of FIG. 7 shall again be described and motivated in other words. In particular, as already outlined above, the embodiment of FIG. 7 relates to POC delta derivation. As described, sub-pictures 24, each sub-picture may, for instance, be one tile or a set of tiles (that conform to a joint bitstream 10) may have non-aligned random access points or different reference structures or GOP structures. As outlined above, such a use case might happen, for example when initially separately encoded bitstreams 32 are merged together into the single data stream 10.

In such cases, the POC (picture order count) that is indicated within the sub-bitstreams 32 of each sub-picture 24 might be different although relating to one common time instant or contributing to one common access unit 46 in the merged data stream 10. When this is the case, this leads to the burden that POC values signaled within the bitstreams 32, namely within the NAL units 34, will have to be rewritten by the composer/merger so that they could be merged into the resulting composed data stream so as to yield one POC value for one access unit. The embodiment of FIG. 7 lessens this burden and allows merging of such sub-picture sub-streams 32 without adjusting the POC values coded into the NAL units such as the header of each sub-picture 24, i.e., tile group header.

A POC is used for derivation of access unit boundaries. That is, usually, a POC is used to associate a group of slices or tile groups or NAL units to an access unit 46. This could be the alternative behavior of the decoder 22 of FIG. 7 in case of being combined with the embodiment of FIG. 2: the concept described in FIG. 7 would be applied by the decoder 22 in case of the indication 44 indicating the sub-picture granularity, while the decoder 22 would expect each access unit 46 to have merely one POC value which is equal within the access unit 46 in case of the indication 44 indicating the picture granularity. The decoder 22 would, in case of the picture granularity, responsive to a POC value change from one NAL unit to another identify the start of a next access unit 46. Identification of access unit interfaces separating consecutive access units 46 in data stream 10 in case of the sub-picture granularity functionality described in FIG. 7 could take place by the decoder 22 on the basis, for instance, of access unit delimiters inserted into data stream 10 by the composer/merger 14, for instance.

Among the different processes that POC values are used for in the decoding process, there are picture output, i.e., pictures are output in an increasing or order of POC, for picture referencing, i.e., to determine which pictures are used for reference, either short term reference pictures or long term reference pictures.

The embodiment described with respect to FIG. 7 allows different signaled values of POC in the NAL units 34' of each of the sub-pictures 24 within the same access unit 46, while still allowing a correct derivation of the POC values 96 finally used for the just-mentioned tasks of picture output and picture referencing, when the several sub-pictures 24 are decoded from the same data stream 10. Random access points typically lead to a reset of the POC value with which a decoder starts a decoding process at the beginning of a bitstream. When the decoder finds an IDR, it typically assigns a POC value of 0 to that picture and derives the POC value of following pictures based on that. The following access units or NAL units within the access unit contain information such as a (tile group) header bit, signaling the POC of the access unit they belong to. Typically, the POC is signaled with LSB bits in the header of slices/tile groups and the MSB bits are derived by the decoder. This process would, if applied in the scenario outlined in FIG. 7, lead to wrong derivation of access unit boundaries, reference pictures and output order when sub-pictures of an access unit contains different POC LSB values or different POC LSB length within one access unit.

The embodiment described with respect to FIG. 7 used a per sub-picture deltaPOC computation that keeps track of the difference among different sub-picture bitstreams 32. For instance, when the decoding process of decoder 22 starts at a regular full picture IRAP, all NAL units 34' of access unit 46 carry the same POC value (NAL POC LSB). The POC MSB is set to 0 at this instance and the newly introduced deltaPOC. Now, in the course of the CVS, a sub-picture RAP may occur and carries a different NAL POC LSB e.g., a zero value, while other NAL POC LSBs in the access unit remain unchanged (unequal to 0). Whenever a sub-picture RAP is recognized as described above or through the state of the art signaling such as by way of a NAL unit type or an SEI message, a deltaPOC is derived for this sub-picture as the difference between the sub-picture IRAP NALU POC LSB and the other NALU POC LSBs in the access unit. A full-picture POC 96 is derived for all NALUs as a basis for the above functionalities of picture output, picture referencing and so forth. When handling the sub-picture IRAP NALUs, the full picture POC 96 incorporates the non-zero deltaPOC, while for the remaining non-sub-picture IRAP NALU, incorporated the respective 0 deltaPOC into calculation of the full picture POC 96 results in the same full-picture POC value 96 for all NALU for an access unit 46. FIG. 8 illustrates the POC compensation according to FIG. 7 using an example, where four consecutive pictures 18a to 18d of the video 16 are shown, each one subdivided into three sub-pictures 24 wherein the first picture 18a is an IRAP picture, i.e., all its sub-pictures 24 are random access points, while the second picture 18b and the fourth picture 18d have all their sub-pictures 24 non-RAP coded. The third picture 18c has one sub-picture 24, namely the upper one in FIG. 8, coded in a random access point manner, while the other are not coded in such a manner. As can be seen, FIG. 8 illustrates an easy example of function 94, namely an addition with a constant which represents the POC compensation parameter, namely the second addend in the summations inscribed in the individual sub-pictures 24. The first addend represents the signaled POC value, i.e. the input to the parametrizable function, while the resulting sum corresponds to the final POC value 96. As illustrated in FIG. 8, the decoder obtained the POC compensation offset by a subtraction 98 of the final POC value for one of the non-RAP sub-pictures 24 of picture 18c with the transmitted POC value of the RAP sub-picture 24.

The introduction of the described full picture POC scheme may be gated through an SPS/PPS level flag. Alternatively, instead of implicit derivation of the deltaPOC value, i.e., the POC compensation offset, a parameter set within data stream 10 may indicate the deltaPOC that should be subtracted/added by way of function 94 to each sub-picture POC value 90 so that the resulting full-picture POC 96 is aligned for each sub-picture 24 of a currently decoded picture 18 or a current access unit 46 in data stream 10. For the case that sub-picture IRAP NALUs are in an access unit 46, additional constraints may be needed for the full-picture POC to be derivable.

For instance, it could be made a requirement of data stream 10, i.e., a requirement of bitstream conformance, that at least one sub-picture non-IRAP NALU is present in the access unit 46, i.e., at least one sub-picture 24 of each picture 18 is coded in a non-RAP manner, to allow derivation of the current full picture POC 96 according to which the delta-POCs, i.e., the POC compensation offsets, of all sub-picture IRAP NALUs are to be derived. In other words, when the sub-RAP is signaled with a new NAL unit type, with a flag and not by allowing different NAL unit types. In such a case, such signaling can only be used if one of the NAL units is not indicated that the NAL unit is a sub-RAP.

A different solution may be the following. When all sub-pictures in an access 46 are recognized to be sub-picture IRAPs, the POC MSB is reset and deltaPOCs per sub-picture 24 are calculated so that all sub-pictures result in the same full-picture POCs. For instance, the first sub-picture deltaPOC in this case is set to 0 and all other sub-picture deltaPOCs are set accordingly to result in the full-picture POC 96 then for the first sub-picture IRAP NALU in the access unit.

As has also been described above, it is possible that the sub-streams 32 participating in composing data stream 10 are of different POC step size. This could happen for instance, in a conferencing scenario. One stream could be coded at 30 PFS and the other sub-stream 32 at 60 FPS. In such a case, as has been described above, it is one option to merge at the lowest common framerate, i.e., 30 FPS. For this purpose, the highest temporal layer of the 60 FPS sub-stream 32 could be dropped, thereby reducing the framerate to 30 FPS. However, the POC step size between temporally adjacent pictures in the two streams will be different, as the 60 FPS encoder has to accommodate the higher amount of frames with using a comparatively bigger POC step size with respect to the 30 FPS encoder. In a scenario as described above where streams are to be merged together into a common bitstream, care has to be taken to ensure correct POC derivation. When POCs of sub-picture bitstreams have different step size, the embodiment of FIG. 7 allows to enforce a scaling of the POC values 90 of individual sub-pictures 24 within a coded video sequence 10. For instance, a merger/composer 14 would be informed of or derives itself the difference in POC step size from the input sub-picture bitstreams 32 and write a respective POC scaling factor into a parameter set for all sub-picture bitstreams contributing to the composition of data stream 10 in order to align all full picture POCs.

A further notice has been made above, namely that the scaled full picture POC is used for reference picture derivation and output order, while motion vector scaling may remain to be done according to unscaled POC differences. By doing so, correct motion vector scaling as envisaged by the initial encoder is carried out.

Alternatively to keeping track of all the POC values 90 of individual sub-pictures 24, i.e. the unscaled POC, on decoder side, a decoder can derive POC value differences used on encoder side to perform motion vector candidate scaling also from scaled POC values by using the respective POC scaling factor in deriving POC differences for the motion vector scaling.

Further, although POC offset values among parameters 92 were described to be automatically determined by the decoder, it could alternatively or additionally be, that the POC offset values are inserted into the data stream 10 by the composer/merger 14 just as it had been described above with respect to the POC scaling factors.

Figure 9:
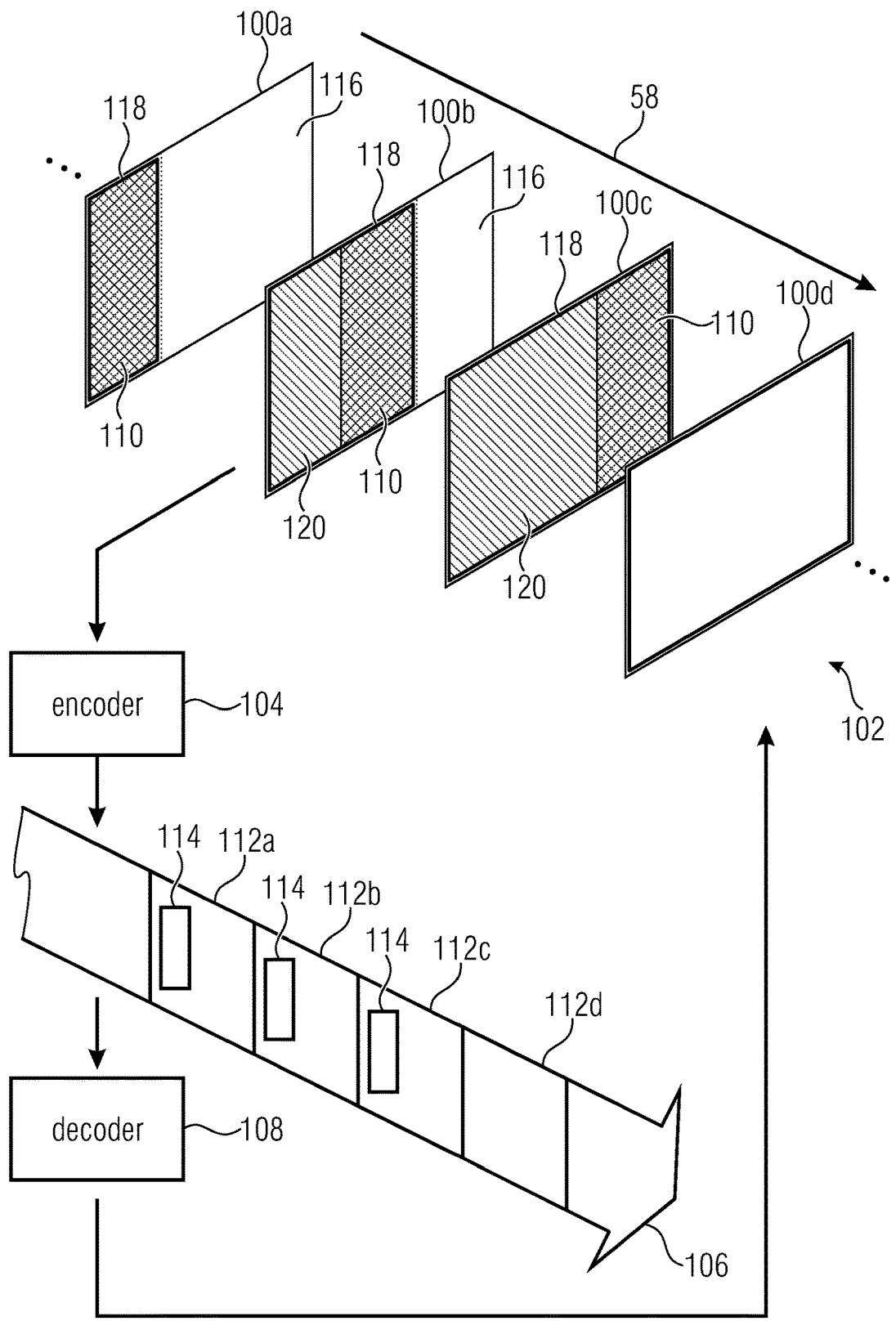
FIG. 9 shows a schematic diagram illustrating an embodiment for encoder and decoder allowing for efficient gradual decoding refresh.

With respect to FIG. 9, the present application proceeds with the description of an example for a video codec allowing for gradual decoding refresh. FIG. 9 illustrates the concept underlying this embodiment.

In particular, FIG. 9 illustrates consecutive pictures 100 of a video 102, namely four consecutive pictures ordered along their coding/decoding order 58. FIG. 9 illustrates an encoder which encodes video 102 into a data stream 106 and a decoder 108 which decodes or reconstructs the video 102 from data stream 106. The concept is as follows. In order to enable gradual decoding refresh, the video decoder 108 logs, for each of reference pictures of the video 102, a subdivision of the respective reference picture into a refreshed picture region and non-refreshed picture region. In particular, reference pictures are those pictures preceding a currently decoded picture in decoding order 58 available for use as a prediction reference for the currently decoded picture or any following picture. The refreshed picture and the non-refreshed picture region just-mentioned will become clear from the following description. In particular, the decoder 108 decodes from the data stream 106 for a certain picture 100a an information on a refresh renewal region 110 which is shown cross hatched in FIG. 9. In the example of FIG. 9, it encompasses the left hand side third of picture 100a. The encoder encodes, for instance, each picture 100a to 100d into a respective access unit 112a to 112d and signals in the access unit 112a for picture 100a the information 114 which locates the refresh renewal region 110 within picture 100a. The indication of refresh renewal region 114 may initiate the gradual decoding refresh which causes special measures for the coding and decoding of pictures 100a and some following pictures up to complete gradual decoding refresh on both sides, the encoder 104 and the decoder 108 as will explained in more detail below.

In particular, the region 110 located by information 114 is encoded by intra-coding only by the encoder 104, i.e., represents a region coding in a random access point manner, and the decoder 108, accordingly, decodes the refresh renewal region 110 accordingly, namely using intra-prediction. The coding of the other region, i.e., the remaining region 116, of picture 100a is not further restricted and may be encoded by encoder 104 and accordingly decoded by decoded 108 using intra-prediction and/or inter-prediction based on previous pictures.

For the next picture 100b in coding/decoding order 58, the gradual decoding refresh has not yet been completed. The encoder 104 encodes this picture 100b into the corresponding access unit 112b and signals therein, again, the information 114 on a refresh renewal region 110 within that picture 100b. In the example of FIG. 9, the refresh renewal region of picture 100b covers the horizontal mid third of picture 100b and, accordingly, spatially adjoins the refresh renewal region 110 of the previous picture 100a. While information 114 within access unit 112a initiated the gradual decoding refresh, information 114 with respect to picture 112b represents a continuation of this initiated gradual decoding refresh. The region 110 of picture 100b is, again, encoded by encoder 104 by intra-prediction only and decoded by decoder 108 accordingly. As part of the initiated gradual decoding refresh, however, decoder 108 as well as encoder 104 perform the following tasks: firstly, encoder 104 and decoder 108 perform the aforementioned logging of refreshed pictures regions of reference pictures. As a gradual decoding refresh has been initiated at picture 100a, and picture 100a forms a reference picture with respect to the succeeding picture 100b, the refresh renewal region 110 of picture 100a represents a refreshed picture region of picture 100a while the other region 116 is a non-refreshed picture region. Refreshed picture regions are indicated in FIG. 9 by being encircled by a continuous line 118. Secondly, decoder 108 and encoder 104 determine within the currently encoded/decoded picture, namely in the current description picture 100b, a first region 120 which is disjoined to the refresh renewal region 110 of the same picture 100*b* and to be coded and to be decoded independent from the non-refreshed picture region of the reference pictures, here picture 100*a*. Encoder 104 may code explicit signaling on where region 120 is, or, more advantageously, encoder 104 and decoder 108 determine region 120 as that region of picture 100*b* which is collocated to the refreshed picture region 118 of picture 100*a*, i.e., the immediately preceding picture in coding/decoding order 58. In order to differentiate region 120 from the refresh renewal regions 110, refresh renewal regions 110 are illustrated in FIG. 9 using cross hatching, while simple hatching is used for region 120.

Both, encoder and decoder take special measures in order to encode/decode region 120 into/from the corresponding access unit 112*b*. In particular, the encoder 104 does, for instance, not restrict the signalable domain of coding parameters based on which the prediction of region 120 is to be derived by encoder and decoder. In other words, encoder 104 encodes the pictures into the corresponding access units using coding parameters which determine a prediction of these pictures from previous pictures such as using motion-compensated-prediction, and using prediction residual information describing the prediction residual using which this prediction is to be corrected. Coding parameters and prediction residual information are coded into the access units so as to describe the corresponding pictures. Within the refresh renewal regions 110, however, the encoder 104 exclusively uses intra-prediction, i.e., no prediction from any other picture is used. With respect to region 120, the encoder 104 uses inter-prediction and does not restrict, for instance, the signalable domain of the coding parameters, but a different way of deriving the prediction of region 120 based on the signaled coding parameters is used by encoder 104 and decoder 108 compared to other regions such as region 116. In particular, the location of the refresh picture region 110 of the respective reference picture, here picture 100*a*, is taken into account. For instance, the encoder 104 is free to encode into the data stream 106 motion vectors for region 120 which would, if the prediction derivation would not be varied, lead to a dependency of region 120 on region 116, i.e., motion vectors which actually point to portions of the reference picture 100*a* reaching out into region 116. Similarly, the encoder 104 may use motion vector prediction for coding the motion vectors for region 120, but in construing corresponding motion vector prediction lists of motion vector predictor candidates formed by the motion vectors used for coding picture 100*a*, the encoder 104 exclusively populates these motion vector predictor candidate lists using motion vectors used for blocks within the refreshed picture region 110 exclusively. The possibility, that the encoder 104 may use signalable states which are, in fact, redirected to prediction derivation results for region 120 which would actually also have been signalable by other states of the coding parameters for region 120 provides the encoder 104 with an increased possibility of increasing the compression efficiency as, for instance, sometimes those coding parameter states which are later on redirected by encoder 104 and decoder 108 to other states leading to a prediction solely depending on the renewed picture region 110 may be one which is encodable using less bits than the coding parameter state which would describe this prediction right away without any redirection by encoder 104 and decoder 108. That is, encoder 104 and decoder 108 could, for instance, clip motion vectors actually signaled in the data stream 106 for region 120 so as to not reach-out beyond the borders of the refresh picture region 110 of the reference picture 100*a*. Alternatively or additionally, encoder and decoder 108 could use padding for portions of reference picture 108 pointed to by motion vectors signaled in the data stream 106 for region 120, which exceed the borders of the refreshed picture region 110. Even alternatively or additionally, the motion vector candidate list construction done by encoder 104 and decoder 108 could be done in a manner so as to exclude motion vectors from populating such lists which lie outside the refreshed picture region 110 within the reference picture 100*a*. The encoder 104 may, for instance, signal to the decoder 108 the chosen motion vector predictor by signaling within data stream 106 and index into such a motion vector candidate list construed accordingly. The remaining region of picture 100*b*, in case of FIG. 9, the right-hand third of picture 100*b*, represents a region 116 disjoined to the first region 120 and the refresh renewal region 110 of this picture 100*b* and a region coded by encoder 104 including inter-prediction without any restriction to the refresh picture region 110 of picture 100*a*. That is, region 116 of picture 100*b* is an inter-predicted region without any restrictions.

The subsequently coded/decoded picture 100*c* represents, in the example of FIG. 9, the completion of the gradual decoding refresh initiated at picture 100*a*. The encoder 104 codes for this picture 100*c* into the corresponding access unit 112*c* the information 114 indicating the location of the refresh renewal region 110 of picture 100*c* which, in case of FIG. 9 covers the right-hand third of picture 100*c*. That is, FIG. 9 shows that the refresh renewal regions 110 of the consecutive pictures 100*a* to 100*c* starting at picture 100*a* which represents the start of the gradual decoding refresh, assume mutually disjoined portions of the picture area of the pictures of video 102. This picture 110 is, again, intra-coded by encoder 104 and decoded by decoder 108 accordingly.

For picture 100*c*, picture 100*b* also represents a reference picture. Its refreshed picture region 118 is determined by encoder and decoder as the union of the first region 120 and the refresh renewal region 110 of picture 100*b*. This, in turn, means that during the gradual decoding refresh, the refreshed picture region 118 continuously grows. Again encoder 104 and decoder 108 determine the first region 120 of picture 100*c* such as, for instance, so as to be the region spatially overlapping the refreshed picture region 110 of the immediately preceding picture, namely picture 100*b*. This region 120 is coded/decoded as previously described with respect to region 120 of picture 100*b*, the difference being that region 120 has to two reference picture candidates, namely picture 100*a* with refreshed picture region 118, and picture 100*b* with its refreshed picture region 118. Inter-prediction is used for region 120, i.e., is an allowed coding mode besides inter-prediction mode, but the coding parameters for region 120 of picture 100*c* are redirected to states so that the resulting predictions do not incur any dependencies of the coding/decoding of region 120 from the non-refreshed regions 116 of pictures 100*a* and 100*b*.

From picture 100*c* onward, the gradual decoding refresh initiated by encoder 104 at picture 100*a* is completed and the refreshed picture region 118 covers, from that picture 100*c* onwards, the complete picture are of the pictures of video 102. Intermittently, or periodically, the encoder 104 may initiate another gradual decoding refresh and the refresh picture region would collapse to correspond to the refresh renewal region 110 of the first initiating picture of that following gradual decoding refresh.

Gradual decoding refresh as described with respect to FIG. 9 may be described as sub-picture intra-refresh padding. It could be implemented using tiles or tile groups or could be implemented without use of tiles. In the embodiment of FIG. 9, some parts of the pictures, which could be called sub-pictures, are refreshed, namely the regions 110, by applying intra-coding, while following pictures are inter-coded and inter-decoded in a constrained way. In accordance with the example of FIG. 9, the pictures were sub-divided into columns, here exemplarily into N=3 columns, but it should be clear that the number of columns N could be chosen differently, and that even a different form of growth of the refreshed picture region 118 during such gradual decoding refresh could be chosen such as a growth in units of blocks rather than columns of the pictures. As explained with respect to FIG. 9, at the first sub-picture RAP, i.e., the picture at access unit 0, picture 100a in the case of FIG. 9, the first column, let it be colIdx=0 is encoded only within intra-blocks.

At the next access unit, AU=1, that is the second picture encoding/decoding order 58, 100b in FIG. 9, the second column, i.e. colIdx=1, is encoded only with intra-blocks and the first column is encoded with inter-coded blocks that can only reference samples that have been decoded in the previous picture at the column colIdx=0. Instead of con-straining the motion vectors that the encoder is able to encode in the data stream, however, the embodiment of FIG. 9 is free to also encode motion vectors which would actually lead to a dependency on other regions when column col-Idx=0. In particular, in accordance with the embodiments of FIG. 9, the intra-refresh region is indicated, i.e. the first column in this example, and padding such as orthogonal extrapolation of the outermost pixel line, is used for refer-enced blocks of inter-coded blocks that exceed the column colIdx=0 of the picture of access unit 1 if the motion vectors point out. Motion vector clipping based on the indication of the region could alternatively or additionally be applied to ensure that motion vectors of refreshed regions do not rely on non-refreshed regions. As the pictures are consecutively decoded, the refreshed region 118 increases and therefore a per-picture refreshed region 110 is indicated.

It should be noted that an alternative to FIG. 9 would be that the encoder 104 signals the consecutive location of renewal refresh regions 110 of the consecutive pictures 100a to 100c, i.e. of the sequence of pictures forming the gradu-ally coding refresh, by indicating a pattern of these regions 110. This pattern would describe the refreshing. A region per sequence could be indicated as well. Thus, this sort of information could be signaled once for picture 100a, i.e. the starting picture of the GDR sequence 100a-100c, thereby signaling the GDR start and the regions 110 for pictures 100a-c. The former indication could be something that could be indicated in the PPS. Alternatively, a GDR start indica-tion could be signaled for picture 100a, such as in the PPS thereof, while the pattern of positions of regions 110 in GGR picture sequences starting at such GDR start picture could be something which is signaled at a higher level such as in the SPS.

With respect to above embodiments, the following is additionally noted. The above embodiments present advan-tageous video codec concepts. Many of them allow for advantageous video composition as outlined above. How-ever, it should be noted that an encoder may form any of the inventive data streams 10 described above directly, i.e. without a composition of pre-encoded sub-streams. An encoder may, in such task, exploit the advantageous char-acteristics of the data stream 10 present above such as the possibility of choosing RAP time instances and reference picture buffer descriptions sub-picture wise instead of pic-ture globally.

Thus, above embodiments also relate to a video decoder—and correspond video encoder and data stream—for decoding a video 16 of pictures 18 from a data stream 10 which has the video encoded thereinto in a manner accord-ing to which sub-pictures 24 into which the pictures are spatially sub-divided are encoded independently from each other. The video decoder is configured to decode from the data stream, for each sub-picture of each picture of a set 42 of one or more pictures of the video, a sub-picture related information 40 such as a syntax element nal_unit_type which, when assuming a first state, identifies the respective sub-picture as being coded in a random access point manner such as when assuming state IDR_N_LP and, when assum-ing a second state such as when assuming state TRAIL_NUT, identifies the respective sub-picture as not being coded in the random access point manner. The decoder decodes from the data stream, for the set 42 of one or more pictures such as one for which a syntax element mixed_nalu_types_in_pic_flag is contained in their PPS, a random access point signaling granularity indication 44 which could be named mixed_nalu_types_in_pic_flag which, when assuming a first granularity or first state such as 0, indicates that, for each picture of the set of one or more pictures, the sub-picture related information assumes a com-mon state such as IDR_N_LP for all sub-pictures of the respective picture, and when assuming a second granularity or second state such as 1, indicates that, for each picture of the set of one or more pictures, the sub-picture related information is allowed to assume different states for the sub-pictures of the respective picture such as IDR_N_LP for at least one sub-picture and TRAIL_NUT for at least one other sub-picture within the same picture. In other words, mixed_nalu_types_in_pic_flag assuming a first state such as being equal to 0, could indicate that the value of nal_unit_type shall be the same for all coded slice NAL units of a picture and, thus, for all sub-pictures within one picture. Otherwise, however, if mixed_nalu_types_in_pic_flag assumes the other state, e.g. is equal to 1, this may indicate that the VCL NAL units of one or more subpictures of the picture all have a particular value of nal_unit_type such as one out of a NAL unit type set consisting of one or more of STSA_NUT, RADL_NUT, RASL_NUT, IDR_W_RADL, IDR_N_LP, and CRA_NUT, while the other VCL NAL units in the picture all have a different particular value of nal_unit_type, namely one out of a further set consisting of one or more of TRAIL_NUT, RADL_NUT, and RASL_NUT. In even other words, mixed_nalu_types_in_pic_flag assuming the second state such as 1 may specify that each picture referring to the PPS which includes mixed_nalu_types_in_pic_flag has more than one VCL NAL unit, the VCL NAL units do not have the same value of nal_unit_type, and the picture is not an IRAP picture, while mixed_nalu_types_in_pic_flag assuming the other state such as 0 may indicate that each picture referring to that PPS has one or more VCL NAL units and the VCL NAL units of each picture referring to the PPS have the same value of nal_unit_type. By this means, mixed_nalu_types_in_pic_flag may be set to the first state such as 1 so as to indicate for pictures referring to the PPS such as ones originating from a subpicture bitstream merging operation that they contain slices with different NAL unit types.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

The inventive encoded video signal or data stream, respectively, can be stored on a digital storage medium or can be transmitted on a transmission medium such as a wireless transmission medium or a wired transmission medium such as the Internet.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A video decoder for decoding a video of pictures from a data stream, the data stream having the video encoded thereinto in a manner according to which sub-pictures into which the pictures are spatially sub-divided are encoded independently from each other, the video decoder configured to:
   decode from the data stream, for each sub-picture of each picture of a set of one or more pictures of the video, a sub-picture related information which, when assuming a first state, identifies the respective sub-picture as being coded in a random access point manner and, when assuming a second state, identifies the respective sub-picture as not being coded in the random access point manner; and
   decode from the data stream, for the set of one or more pictures, a random access point signaling granularity indication which;
      when assuming a first granularity, indicates that, for each picture of the set of one or more pictures, the sub-picture related information assumes a common state for all of the sub-pictures of the respective picture, and
      when assuming a second granularity, indicates that, for each picture of the set of one or more pictures, the sub-picture related information is allowed to assume different states for the sub-pictures of the respective picture.

2. The video decoder of claim 1, configured to identify the data stream as a non-conforming data stream in case of:
   the random access point signaling granularity indication assuming the first granularity, and
   the sub-picture related information assuming, for a predetermined picture of the set of one or more pictures, different states for different sub-pictures of the predetermined picture.

3. The video decoder of claim 1, wherein the random access point signaling granularity indication:

is comprised by a SPS or VPS of the data stream and the set of one or more pictures comprises a sequence of pictures of the video or covers the video, or is conveyed in the data stream per access unit, and the set of one or more pictures comprises one picture.

4. The video decoder of claim 1, wherein the sub-picture related information comprises an integer-valued syntax element discriminating between a plurality of NAL unit types a first subset of one or more NAL unit types of which corresponds to the first state and a second subset of one or more NAL unit types of which corresponds to the second state.

5. The video decoder of claim 1, wherein the random access point signaling granularity indication is conveyed in the data stream in a form distinguished by at least three granularities comprising:

one granularity which, when assumed by the random access point signaling granularity indication, indicates that, for each picture of the set of one or more pictures, the sub-picture related information assumes the first state for all sub-pictures of the respective picture;

a further granularity which, when assumed by the random access point signaling granularity indication, indicates that, for each picture of the set of one or more pictures, the sub-picture related information assumes the second state for all sub-pictures of the respective picture; and an even further granularity which, when assumed by the random access point signaling granularity indication, indicates that, for each picture of the set of one or more pictures, the sub-picture related information is allowed to assume different states for the sub-pictures of the respective picture.

6. The video decoder of claim 1, comprising a DPB and configured to, in case of the random access point signaling granularity indication assuming the second granularity, flush the DPB responsive to the sub-picture related information assuming, for a predetermined picture of the set of one or more pictures, the first state for all sub-pictures of the predetermined picture.

7. The video decoder of claim 6, wherein in case of the random access point signaling granularity indication assuming the second granularity, the decoder is configured to, perform the flushing after parsing or after decoding all sub-pictures of a currently decoded picture.

8. The video decoder of claim 1, comprising a DPB and configured to, in case of the random access point signaling granularity indication assuming the first granularity, flush the DPB responsive to the sub-picture related information assuming, for a predetermined picture of the set of one or more pictures, the first state for a first sub-picture of the predetermined picture, being first in a sub-picture decoding order defined among the sub-pictures of the predetermined picture.

9. The video decoder of claim 8, wherein in case of the random access point signaling granularity indication assuming the first granularity, the video decoder is configured to perform the flushing after parsing or after decoding the first sub-picture of a currently decoded picture.

10. The video decoder of claim 1, comprising a DPB and configured to:

mark pictures in the DPB which are to remain in the DPB to serve as a prediction reference;

remove pictures from the DPB which are not marked and which are not needed for future display; and in case of the random access point signaling granularity indication assuming the second granularity:

decode from the data stream, for a currently decoded picture, a reference picture buffer description for each sub-picture of the currently decoded picture, and identify the pictures in the DPB to be marked by, for the currently decoded picture, forming a union of a sets of reference pictures indicated by the reference picture buffer descriptions for the sub-pictures of the currently decoded picture.

11. The video decoder of claim 10, configured to:

perform the marking of the pictures in the DPB which are to remain in the DPB to serve as a prediction reference, and the removing of the pictures from the DPB which are not marked and which are not needed for future display, picture-wise cyclically; and in case of the random access point signaling granularity indication assuming the second granularity, perform the removing after parsing or after decoding all sub-pictures of the currently decoded picture.

12. The video decoder of claim 1, comprising a DPB and configured to:

mark pictures in the DPB which are to remain in the DPB to serve as a prediction reference;

remove pictures from the DPB which are not marked and which are not needed for future display; and in case of the random access point signaling granularity indication assuming the first granularity;

decode from the data stream, for a currently decoded picture, a reference picture buffer description for a first, in decoding or streaming order, sub-picture of the sub-picture of currently decoded picture, and identify the pictures in the DPB to be marked for the currently decoded picture depending on the reference picture buffer description for the first sub-picture of the currently decoded picture.

13. The video decoder of claim 12, configured to:

perform the marking of the pictures in the DPB which are to remain in the DPB to serve as a prediction reference, and the removing of the pictures from the DPB which are not marked and which are not needed for future display, picture-wise cyclically; and in case of the random access point signaling granularity indication assuming the first granularity, perform the removing after parsing or after decoding the first sub-picture of the currently decoded picture.

14. The video decoder of claim 12, configured to identify the data stream as a non-conforming data stream in case of:

a set of reference pictures indicated by the reference picture buffer description for any sub-picture of the currently decoded picture other than the first sub-picture, comprising a reference picture in the DPB not comprised by a set of reference pictures indicated by the reference picture buffer description for the first sub-picture of the currently decoded picture.

15. The video decoder of claim 1, wherein the pictures are spatially sub-divided into the sub-pictures in a constant manner over a sequence of pictures so that sub-videos are coded into the sequence of pictures and in each picture of the sequence of pictures one sub-picture belongs to one of the sub-videos and wherein each sub-picture is encoded independently from sub-pictures of the pictures which belong to a different sub-video, the video decoder comprising a DPB and configured to:

in case of the random access point signaling granularity indication assuming the second granularity, perform emptying the DPB in units of sub-pictures, and in case of the random access point signaling granularity indication assuming the first granularity, perform the emptying the DPB in units of pictures.

16. The video decoder of claim 15, wherein, in case of the random access point signaling granularity indication assuming the second granularity, the video decoder is configured to:
decode from the data stream, for a currently decoded picture, a reference picture buffer description for each sub-picture of the currently decoded picture; and
for each of the sub-videos, use the reference picture buffer description for a sub-picture of the currently decoded picture which belongs to the respective sub-video to identify among sub-pictures in the DPB which belong to the respective sub-video ones ought to remain in the DPB.

17. The video decoder of claim 15, wherein, in case of the random access point signaling granularity indication assuming the second granularity, the video decoder is configured to:
split the DPB into sub-picture DPB s which comprise, at least, one sub-picture DPB for each sub-picture into which the pictures are spatially sub-divided;
decode from the data stream, for a currently decoded picture, a reference picture buffer description and a sub-picture identifier for each sub-picture of the currently decoded picture;
buffer the sub-pictures of the pictures in the DPB by using each sub-picture DPB for buffering of sub-pictures of a predetermined sub-picture identifier associated with the respective sub-picture DPB; and
for each of the sub-picture DPBs, inspect whether the currently decoded picture comprises a corresponding sub-picture the sub-picture identifier of which equals the predetermined sub-picture identifier associated with the respective sub-picture DPB and, if so, use the reference picture buffer description for the corresponding sub-picture to identify sub-pictures in the respective sub-picture DPB ought to remain in the DPB.

18. The video decoder of claim 17, wherein, in case of the random access point signaling granularity indication assuming the second granularity, the video decoder is configured to:
if the currently decoded picture does not comprise a corresponding sub-picture the sub-picture identifier of which equals the predetermined sub-picture identifier associated with the respective sub-picture DPB, flush the respective sub-picture DPB and re-assign the respective sub-picture DPB to another predetermined sub-picture identifier of a non-corresponding sub-picture of the currently decoded picture, unequal to the predetermined sub-picture identifier of all sub-picture DPBs.

19. The video decoder of claim 1, wherein the pictures are spatially sub-divided into the sub-pictures in a constant over a sequence of pictures so that sub-videos are coded into sequence of pictures and in each picture of the sequence of pictures one sub-picture belongs to one of the sub-videos and wherein each sub-picture is encoded independently from sub-pictures of the pictures which belong to a different sub-video, the video decoder configured to:
decode from the data stream, for each sub-picture of each picture of the set of one or more pictures, a first POC value,
if the random access point signaling granularity indication assumes the second granularity, manage, for each sub-video, one or more inter-sub-picture POC compensation parameters which parametrize a parametrizable function which, when applied to the first POC value decoded for a sub-picture of a currently decoded picture belonging to the respective sub-video, yields a final POC value so that the final POC values of the sub-pictures of the currently decoded picture are equal to each other.

20. The video decoder of claim 19, wherein for each sub-video, the one or more inter-sub-picture POC compensation parameters comprise a POC compensation offset which, by the parametrizable function, offsets the first POC value decoded for sub-pictures of the respective sub-video, and the video decoder is configured to:
reset the POC compensation offset for a predetermined sub-video of a predetermined picture upon encountering a first sub-picture belonging to the predetermined sub-video for which the sub-picture related information assumes the first state, using a difference between a first POC value decoded for the first sub-picture and a final POC value of a further sub-picture for which the sub-picture related information assumes the second state and which is comprised by a picture, which comprises the first sub-picture.

21. The video decoder of claim 19, wherein for each sub-video, the one or more inter-sub-picture POC compensation parameters comprise a POC compensation offset which, by the parametrizable function, offsets the first POC value decoded for sub-pictures of the respective sub-video, and the video decoder is configured to:
if the sub-picture related information assumes the first state for all sub-pictures of a predetermined picture, set the POC compensation offset for all sub-videos to which the sub-pictures of the predetermined picture belong equally to a default POC value.

22. The video decoder of claim 19, wherein for each sub-video, the one or more inter-sub-picture POC compensation parameters comprise a POC step size scaling factor which, by the parametrizable function, scales the final POC value.

23. The video decoder of claim 22, configured to derive, for each sub-video, the POC step size scaling factor from the data stream.

24. The video decoder of claim 19, configured to
use the final POC value for picture output and/or referencing of buffered reference pictures.

25. The video decoder of claim 19, configured to use, for each sub-video, POC values decoded for the sub-pictures which belong to the respective sub-video for scaling motion vector prediction candidates used in decoding the sub-pictures which belong to the respective sub-video.

26. The video decoder of claim 19, wherein for each sub-video, the one or more inter-sub-picture POC compensation parameters comprise a POC step size scaling factor which, by the parametrizable function, scales the final POC value, and the video decoder is configured to:
perform, for each sub-video, motion vector prediction candidate scaling used in decoding the sub-pictures which belong to the respective sub-video, by inversely scaling the final POC values so as to acquire inversely scaled POC values and use the inversely scaled POC values for scaling motion vector prediction candidates used in decoding the sub-pictures which belong to the respective sub-video.

27. A method for decoding a video of pictures from a data stream, the data stream having the video encoded thereinto in a manner according to which sub-pictures into which the pictures are spatially sub-divided are encoded independently from each other, the method comprising:
- decode from the data stream, for each sub-picture of each picture of a set of one or more pictures of the video, a sub-picture related information which, when assuming a first state, identifies the respective sub-picture as being coded in a random access point manner and, when assuming a second state, identifies the respective sub-picture as not being coded in the random access point manner; and
- decode from the data stream, for the set of one or more pictures, a random access point signaling granularity indication which:
  - when assuming a first granularity, indicates that, for each picture of the set of one or more pictures, the sub-picture related information assumes a common state for all of the sub-pictures of the respective picture, and
- when assuming a second granularity, indicates that, for each picture of the set of one or more pictures, the sub-picture related information is allowed to assume different states for the sub-pictures of the respective picture.

\* \* \* \* \*